United States Patent
Schilling et al.

[11] Patent Number: 6,078,576
[45] Date of Patent: Jun. 20, 2000

[54] HIGH PROCESSING GAIN CDMA/TDMA SYSTEM AND METHOD

[75] Inventors: Donald L. Schilling, Sands Point; Elmer Yuen, New York, both of N.Y.; Joseph Garodnick, Centerville, Mass.

[73] Assignee: Golden Bridge Technology, Inc., West Long Branch, N.J.

[21] Appl. No.: 09/018,657

[22] Filed: Feb. 4, 1998

[51] Int. Cl.[7] .................................................. H04B 7/212
[52] U.S. Cl. ......................... 370/347; 370/335; 370/337; 375/130; 375/343
[58] Field of Search ..................................... 370/347, 342, 370/335, 337; 379/418; 455/426; 375/343, 130, 131, 140, 141, 152, 145

[56] References Cited

U.S. PATENT DOCUMENTS

| | | | |
|---|---|---|---|
| 5,081,643 | 1/1992 | Schilling | 375/1 |
| 5,109,390 | 4/1992 | Gilhousen et al. | 375/1 |
| 5,267,244 | 11/1993 | Messerschmitt et al. | 370/95.3 |

*Primary Examiner*—Michael Horabik
*Assistant Examiner*—Prenell Jones
*Attorney, Agent, or Firm*—David Newman Chartered

[57] ABSTRACT

A system and method for W-CDMA transmissions from the base to a remote unit and spread-TDMA transmissions from the remote unit to the base. By using spread-TDMA on the reverse link, limitations inherent with the use of CDMA due to non-zero cross correlation are avoided. The resulting system provides high quality performance in both directions.

7 Claims, 14 Drawing Sheets

HIGH PROCESSING GAIN CDMA/TDMA SYSTEM AND METHOD

BACKGROUND OF THE INVENTION

This invention relates to a wireless telecommunication system employing spread-spectrum transmissions and more particularly to a spread spectrum system and method employing spread-spectrum time-division-multiple-access (SS-TDMA) transmission from the remote unit to the base and wideband code division multiple access (W-CDMA) transmission from the base to the remote unit.

DESCRIPTION OF THE RELEVANT ART

Since the demonstration of the cellular phone concept in the 1970's in Chicago, the greatest innovations in wireless communications have been in the infrastructure that would allow ubiquitous coverage. In addition, at the expense of voice fidelity, the latest systems increase the system capacity by using voice compression and digital modulation techniques. During the same period, wire communications has grown in the areas of packet switching, internet, facsimile and video telephony. Today, one uses the telephone wire connection for all of these services. Wired integrated service data network (ISDN) service employing circuit switching is now available throughout the USA and in most parts of the world. The reason that these services are not available in an untethered environment is that the wireless systems that have been adopted restricted themselves to narrow bandwidths. In the future, wired and wireless communication will tend to be more packet-switching oriented to increase data flow. The automatic teller machine (ATM) is the packet switching system of choice as it permits simultaneous transmission of voice, data and video, and allows for delay sensitivity.

While ATM is primarily a connection-oriented service, it readily acts as a bearer for connectionless packet sources, which is optimum for bursty data transmission, such as internet access.

Time division multiple access (TDMA) systems are inefficient, since TDMA systems require frequency reuse to protect from adjacent channel interference. In addition, TDMA systems suffer from Rayleigh fading caused by multipath interference. Thus, many investigators have proposed spreading the TDMA signal, since spread-spectrum modulation offers immunity to multipath and adjacent channel interference. Users in adjacent channels employ different spreading sequences and spread-spectrum modulation systems have the ability to minimize multipath interference, provided that the spread bandwidth and processing gain are sufficiently high.

The problem with TDMA and CDMA systems is that at high bit rates, the processing gain is very small. For example, consider a GSM type system used for 384 kilobits per second (kb/s). With forward error correction (FEC) and overhead, the transmitted data rate can be assumed to be approximately 800 kb/s. Since eight users share a single frequency band, a bandwidth of 8×800 kb/s=6.4 MHz is required. If the chip rate were approximately 5 megachips per second, then the processing gain (PG) is approximately 0.8. This processing gain is hardly sufficient. In fact, the Federal Communications Commission (FCC) requires a minimum processing gain of ten (PG=10) to qualify as a spread-spectrum system operating in the industrial-scientific-medical (ISM) band. If the TDMA system were to operate with additional users (time slots), then the processing gain would decrease further.

SUMMARY OF THE INVENTION

A general object of the invention is a spread-spectrum CDMA/TDMA system having high interference immunity as well as high capacity when transmitting high quality voice, data, video and multimedia.

Another object of the invention is a CDMA/TDMA system having a digital matched-filter-based spread-spectrum receiver capable of the very short synchronization times required for packet switching.

A further object of the invention is a spread-spectrum system that combines CDMA and TDMA to reduce the effects of multipath and interference between users.

A still further object of the invention is a CDMA/TDMA system having increased capacity through the spreading of each user's burst transmission on the reverse path while retaining high processing gain.

Another object of the invention is a CDMA/TDMA system which allows packet switching of high data rate packets.

Another object of the invention is a W-CDMA system that achieves constant, high processing gain through the use of parallel codes.

According to the present invention, as embodied and broadly described herein, a CDMA/TDMA system and method is provided employing wideband code-division-multiple-access (W-CDMA) transmission from a base terminal to a remote unit and spread-spectrum-time-division-multiple-access (SS-TDMA) transmission from the remote unit to the base terminal. This combined CDMA/TDMA system and method minimizes the problems commonly associated with systems using either CDMA or TDMA in both directions. With the present invention, orthogonality exists in both the forward and reverse directions, multipath is minimized, and the near-far problem is eliminated.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Reference now is made in detail to the present preferred embodiments of the invention, examples of which are illustrated in the accompanying drawings, wherein like numerals indicate like elements throughout the several views.

Figure 1:
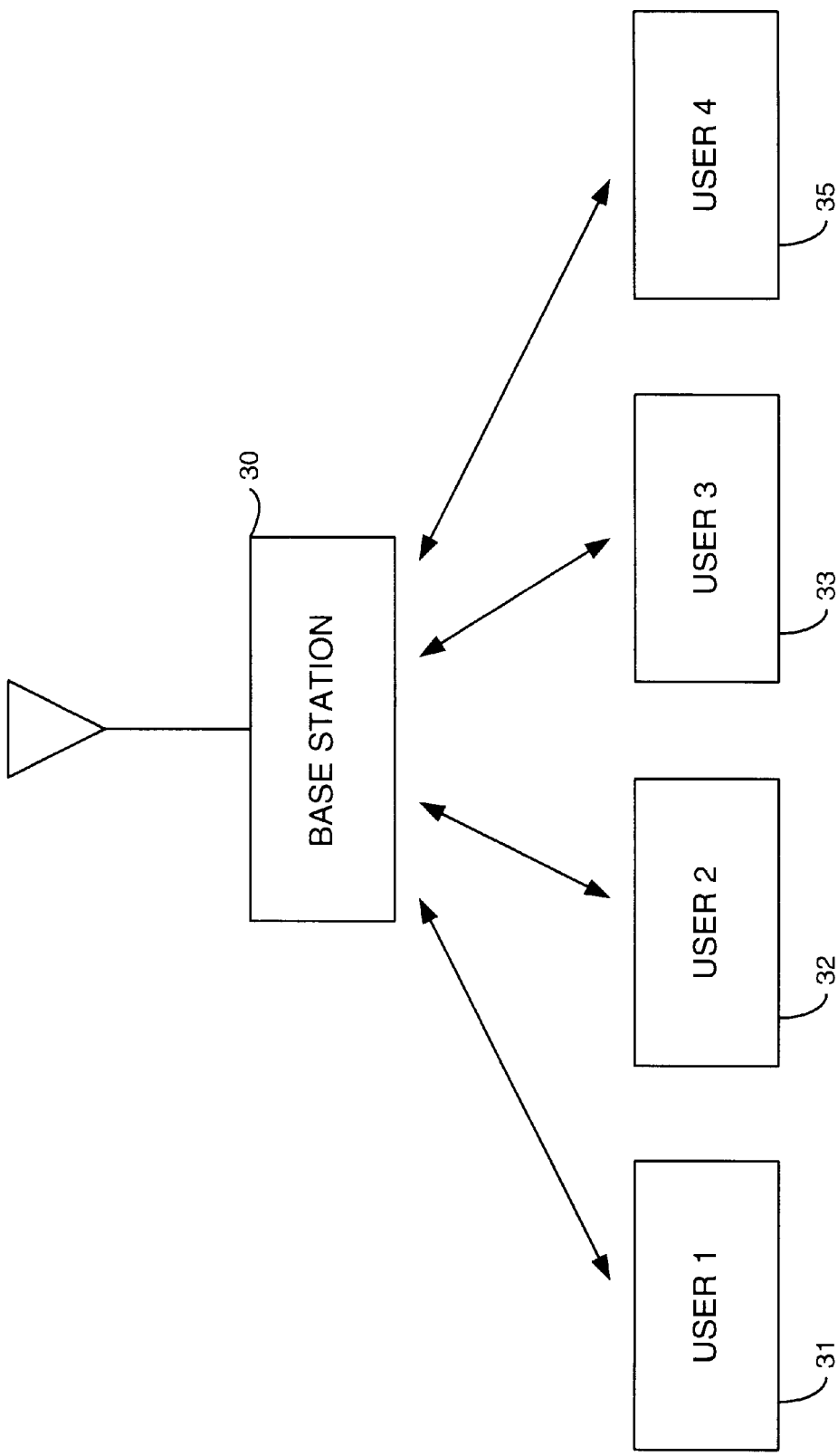
FIG. 1 illustrates a SS-TDMA system.

The present invention provides a new and novel SS-TDMA system, illustrated in FIG. 1, using a SS-TDMA-spread-spectrum signal. The SS-TDMA system might be used as part of a radio based ethernet system, or an ATM system, or any other networked system. The SS-TDMA system could be used for connection-oriented as well as connectionless applications. The SS-TDMA system includes a base station 30 communicating with a plurality of users 31, 32, 33, 34. The SS-TDMA system alternatively could be used to communicate between two users, i.e., a peer-to-peer system, or several base stations could be accessed when needed.

In a particular embodiment, for a communications link from a user 31 to a base station 30, the base station 30 has a SS-TDMA receiver, and each user has a SS-TDMA transmitter. Although each user 31, 32, 33 may transmit at a constant power level, the power level of each signal arriving at the base station 30 from each user 31 most likely is different. Since the signal from each user arrives in a time slot different from the other user, the power level of the signal from one user does not interfere with the power level of the signal from another user. The use of TDMA time slots makes the signals arriving from each user orthogonal to the other users. The use of TDMA time slots lessens near-far power control problems, and is thus advantageous over code-division-multiple-access (CDMA) systems which have near-far power control problems.

The sequence of time slots for each user preferably is controlled and coordinated at the base station 30. A particular time slot, within a sequence of time slots, is assigned and communicated from the base station 30, preferably in a header, to each user.

The present invention is the SS-TDMA link, which in a preferred embodiment, is from a user, such as the user 31, to the base station 30. The present invention is illustrated, by way of example, with a SS-TDMA transmitter transmitting the spread-spectrum TDMA signal to a SS-TDMA receiver.

For a communications link from the base station 30 to a user 31, CDMA may be used without TDMA. The base station 30 can transmit at a constant power level, which allows CDMA to be used since the power level for each channel of the CDMA system is relatively constant, when arriving at each user. Also, each user's spread-spectrum signal or plurality of spread-spectrum signals in the CDMA system is orthogonal to other users, since transmission is from a single source, the base station, and orthogonal chip-sequence signals are used for spreading.

The SS-TDMA-spread-spectrum signal, in a preferred embodiment, includes a header, followed in time by a multichannel-spread-spectrum signal. The header is concatenated with the multichannel-spread-spectrum signal. The header is generated from spread-spectrum processing, by using techniques well known in the art, a header-symbol-sequence signal with a chip-sequence signal. The header-symbol-sequence signal is predefined sequence of symbols. The header-symbol-sequence signal may be a constant value, i.e., just a series of 1-bits or symbols, or a series of 0-bits or symbols, or alternating 1-bits and 0-bits or alternating symbols, a pseudorandom symbol sequence, or other predefined sequence as desired. The chip-sequence signal is user defined, and in a usual practice, is used with a header-symbol-sequence signal. The header, in a preferred embodiment, includes a chip-sequence signal used for the purpose of synchronization.

Each spread-spectrum channel of the multichannel-spread-spectrum signal part of the SS-TDMA-spread-spectrum signal is generated similarly, from techniques well known in the art as used for the header, by spread-spectrum processing a sub-data-sequence signal with a respective chip-sequence signal. The sub-data-sequence signal may be derived from data, or an analog signal converted to data, signalling information, or other source of data symbols or bits. The chip-sequence signal can bat user defined, and preferably is orthogonal to other chip-sequence signals used for generating the plurality of spread-spectrum channels. The demultiplexing of data and spread-spectrum modulating each demultiplexed channel as a spread-spectrum signal and forming a multichannel spread-spectrum signal, keeps processing gain (PG) constant, independent of data rate. For a high data rate, for example, the multichannel spread-spectrum signal may include 128 channels. Sixty-four channels may be on an in-phase component and sixty-four channels may be on a quadrature-phase component.

SS-TDMA System

The present invention broadly comprises a SS-TDMA system for communicating data between a plurality of SS-TDMA transmitters and a plurality of SS-TDMA receivers, preferably using radio waves. The terms "SS-TDMA transmitter" and "SS-TDMA receiver", as used herein, denote the overall system components for transmitting and receiving, respectively, data.

Each SS-TDMA transmitter includes transmitter-memory means, transmitter TDMA means, demultiplexer means, transmitter-spread-spectrum means, combiner means, header means, and transmitter-carrier means. The transmitter TDMA means is coupled to the transmitter-memory means. The demultiplexer means, which is coupled to the transmitter TDMA means, has a plurality of outputs. The transmitter-spread-spectrum means is coupled to the plurality of outputs of the demultiplexer means. The combiner means is coupled between the transmitter-spread-spectrum means and the header means.

The transmitter-memory means is coupled to a data input, and stores data from the data input. The transmitter TDMA means sends the data, within an assigned time slot, from the transmitter-memory means as TDMA data. The demultiplexer means demultiplexes the TDMA data into a plurality of sub-data-sequence signals, with a respective sub-data-sequence signal at a respective output of the demultiplexer means. The transmitter-spread-spectrum means spread-spectrum processes each of the sub-data-sequence signals with a respective chip-sequence signal. The output of the transmitter-spread-spectrum means is a plurality of spread-spectrum channels, with each spread-spectrum channel corresponding to one of the outputs of the demultiplexer means. The combiner means algebraically combines the plurality of spread-spectrum channels as a multichannel-spread-spectrum signal. The header means concatenates a header to the multichannel-spread-spectrum signal. The header is for chip-sequence synchronization. At the output of the header means is the SS-TDMA-spread-spectrum signal. The transmitter-carrier means transmits, at a carrier frequency, the SS-TDMA-spread-spectrum signal, using radio waves, over a communications channel.

The header preferably includes information from the base station 30 for each user 31, 32, 33, as to which time slot a user is using. Alternatively, the time slot information may be sent as part of the data.

Each of the SS-TDMA receivers includes translating means, header-detection means, processor means, receiver-spread-spectrum means, multiplexing means, receiver TDMA means, and receiver-memory means. The translating means is coupled to the communications channel. The header-detection means is coupled between the translating means and the processor means. The receiver-spread-spectrum means is coupled to the translating means and to the multiplexing means. The receiver TDMA means is coupled between the multiplexing means and the receiver-memory means. At the output of the receiver-memory means are the received data.

The translating means translates the received SS-TDMA-spread-spectrum signal from the carrier frequency to a processing frequency. The processing frequency may be a radio frequency (RF), an intermediate frequency (IF), a baseband frequency, or other desirable frequency for processing data.

The header-detection means detects, at the processing frequency, the header embedded in the SS-TDMA-spread-spectrum signal. The header-detection means outputs, in response to detecting the header, a header-detection signal.

The processor means generates control and timing signals. These signals are used for controlling sequences and timing of the invention.

The receiver-spread-spectrum means despreads the multichannel spread-spectrum signal of the SS-TDMA-spread-spectrum signal, as a plurality of spread-spectrum signals. The multiplexing means multiplexes the plurality of spread-spectrum signals as the TDMA data. The receiver TDMA means selects, within a time slot from a sequence of time slots, the received-TDMA data as received data, and the receiver memory means stores the received data from the receiver TDMA means and outputs the received data.

Figure 2:
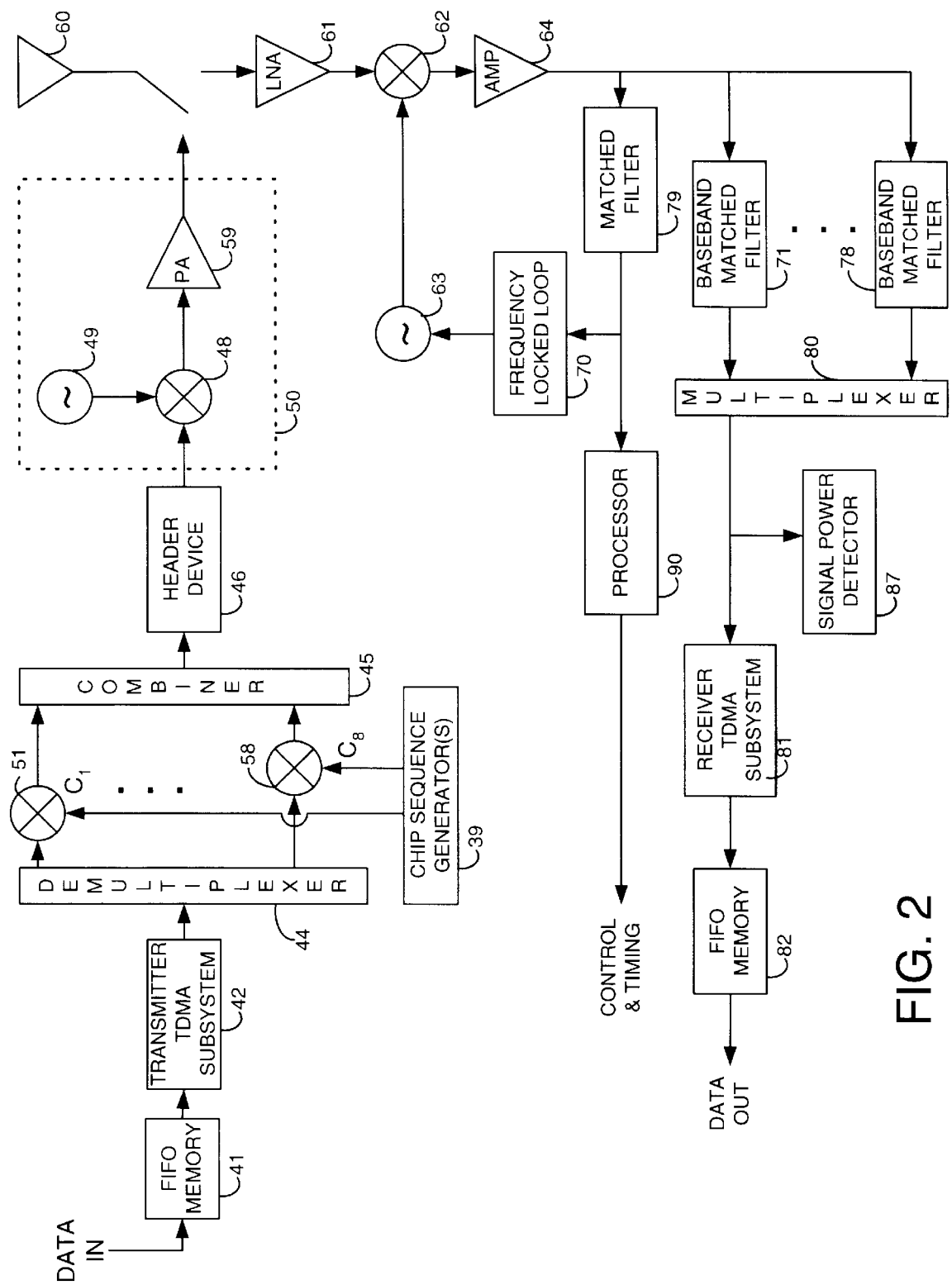
FIG. 2 is a block diagram of a SS-TDMA transmitter and a SS-TDMA receiver.

In the exemplary arrangement shown in FIG. 2, the transmitter-memory means is embodied as a transmitter-first-in-first-out (transmitter-FIFO) memory 41. Means for FEC encoding, CRC code, signaling, maintenance, etc., may be added, in transmitter-FIFO memory 41, or incorporated as additional logic or circuitry to transmitter-FIFO memory 41. The transmitter-FIFO memory 41 may employ random access memory (RAM) or other memory components as is well known in the art. The transmitter-FIFO memory 41 may be part of a digital signal processor (DSP); or, preferably, part of an application specific integrated circuit (ASIC).

For the case of an analog signal, an analog-to-digital converter would be inserted before the input to the transmitter-FIFO memory 41 for converting the analog signal to data. The analog-to-digital converter may be a one bit analog-to-digital converter, i.e., a hard limiter.

The transmitter TDMA means is embodied as a transmitter TDMA subsystem 42. The transmitter TDMA subsystem 42 may be a TDMA circuit for sending or gating data within a particular time slot, set by base station 30. The particular time slots and sequence of time slots are communicated from base station 30 to each user, and used in the transmitter TDMA subsystem 42. Circuits are well known in the art for sending data in a time slot of a transmitter TDMA system.

The transmitter TDMA subsystem 42 sends the data from the transmitter-FIFO memory 41, as TDMA data. The TDMA process may include using one or more time slots, as coordinated from the base station 30, for uniquely distinguishing, as TDMA data, a particular data channel. The term TDMA data, as used herein, broadly means data that are transmitted in a particular time slot.

The demultiplexing means is embodied as a demultiplexer 44. The demultiplexer 44 has a plurality of outputs, with each output having a demultiplexed portion of the TDMA data.

The transmitter-spread-spectrum means is embodied as a chip-sequence means and a plurality of product devices 51, 58. The chip-sequence means may be embodied as a chip-sequence generator 39 for generating a plurality of chip-sequence signals. Alternatively, the transmitter-spread-spectrum means may be embodied as a plurality of EXCLUSIVE-OR gates, or equivalent logic devices or circuitry, coupled between the plurality of outputs of the demultiplexer and a memory device for storing the plurality of chip-sequence signals. In this embodiment, the memory device outputs a respective chip-sequence signal to the respective sub-data-sequence signal. A third alternative may include having the transmitter-spread-spectrum means embodied as a memory device, with appropriate detection circuitry so that in response to a particular data symbol or data bit at the output of a particular output the demultiplexer, a chip-sequence signal is substituted for that data symbol or data bit. The transmitter-spread-spectrum means may also be embodied as any other technology known in the art capable of outputting a plurality of chip-sequence signals.

The combining means is embodied as a combiner 45, the header means is embodied as a header device 46 for concatenating a header with data, and the transmitter-carrier means is embodied as a transmitter-carrier subsystem 50. The transmitter-carrier subsystem 50 may include an oscillator 49 and multiplier device 48 for shifting a signal to a carrier frequency, and a power amplifier 59 and/or other circuitry as is well known in the art for transmitting a signal over a communications channel. The signal is transmitted using an antenna 60.

As shown in FIG. 2, the transmitter TDMA subsystem 42 is coupled between the transmitter-FIFO memory 41 and the demultiplexer 44. The chip-sequence generator 39 is coupled to the plurality of product devices 51, 58. The combiner 45 is coupled between the plurality of product devices 51, 58 and the header device 46, and the header device 46 is coupled to the transmitter-carrier subsystem 50.

The transmitter-FIFO memory 41 receives data from a data input, and stores the data.

The transmitter TDMA subsystem 42 sends the data from the transmitter-FIFO 41 as TDMA data. The transmitter TDMA subsystem 42 sends the data using a particular time slot in a sequence of time slots, set by base station 30. The transmitter TDMA subsystem 42 is necessary for distinguishing data from different users. By sending data in the proper time slots, data from a particular user are distinguished from data from other users. Thus, the sending of the data in a particular time slot, or a plurality of time slots, is what defines a user's channel, unlike other multichannel spread-spectrum systems, where a user's channel is defined by a particular chip-sequence signal.

By sending the data with the transmitter TDMA subsystem 42, a common set of chip-sequence signals can be used by all users, reducing the cost of having matched filters or correlators. The reduced cost is achieved since, at a receiver, only one set of matched filters or correlators would be required for the despreading of the multichannel-spread-spectrum signal from all users, and different sets of matched-filters or correlators are not required for each user.

The demultiplexer 44 demultiplexes the TDMA data into a plurality of sub-data-sequence signals, for example, 128 sub-data-sequence signals, with a respective sub-data-sequence signal at a respective output of the demultiplexer 44. The demultiplexer 44 may be embodied as a serial-to-parallel converter.

The chip-sequence generator 39 generates a plurality of chip-sequence signals. Each of the chip-sequence signals of the plurality of chip-sequence signals has low correlation with the other chip-sequence signals in the plurality of chip-sequence signals, and is preferably orthogonal to the other chip-sequence signals in the plurality of chip-sequence signals.

The plurality of product devices 51, 58, for example, may be embodied as a plurality of EXCLUSIVE-OR gates coupled between the plurality of outputs of the demultiplexer 44 and the chip-sequence means. Each EXCLUSIVE-OR gate multiplies a respective sub-data-sequence signal from the demultiplexer, by a respective chip-sequence signal from the chip-sequence generator 39.

The plurality of product devices 51, 58 multiplies each of the sub-data-sequence signals by a respective chip-sequence signal. At the output of the plurality of product devices 51, 58 is a plurality of spread-spectrum channels, respectively. A particular spread-spectrum channel is identified by the chip-sequence signal that was used to spread-spectrum process the particular sub-data sequence signal.

The combiner 45 algebraically combines the plurality of spread-spectrum channels, and outputs the combined signal as a multichannel-spread-spectrum signal. Preferably, the combiner 45 combines the plurality of spread-spectrum channels linearly, although some nonlinear process may be involved without significant degradation in system performance.

The header device 46 concatenates a header to the multichannel-spread-spectrum signal. At the output of the header device 46 is the SS-TDMA-spread-spectrum signal. The header is for chip-sequence synchronization at the receiver.

The transmitter-carrier subsystem 50 transmits, at a carrier frequency, the SS-TDMA-spread-spectrum signal using radio waves over a communications channel. The transmitter-carrier subsystem 50 of the SS-TDMA transmitter includes appropriate filters, power amplifiers and matching circuits coupled to an antenna 60. The transmitter-carrier subsystem 50 also may include a hard limiter, for hard limiting the SS-TDMA-spread-spectrum signal before transmitting.

At the receiver, as shown in FIG. 2, the translating means is shown as a translating device 62 with oscillator 63 and frequency locked loop 70. The translating device 62 is coupled through an antenna 61 to the communications channel and through an amplifier 64 to the header-matched filter 79. The translating device 62 is coupled to oscillator 63, and the oscillator 63 is coupled to frequency locked loop 70. The header-matched filter 79 is coupled to frequency locked loop 70. The processor 90 is coupled to the header-matched filter 79. The plurality of data-matched filters 71, 78 is coupled between the translating device 62 and the multiplexer 80. The receiver TDMA subsystem 81 is coupled between the multiplexer 80 and the receiver-FIFO memory 82.

The translating device 62 translates the received SS-TDMA-spread-spectrum signal from the carrier frequency to a processing frequency. The translating device 62 may be a mixer, which is well known in the art, for shifting an information signal, which in this disclosure is the received SS-TDMA-spread-spectrum signal, modulated at a carrier frequency to IF or baseband. The processing frequency may be RF, IF, baseband frequency or other desired frequency for a digital signal processor. The signal for shifting the received SS-TDMA-spread-spectrum signal is produced by oscillator 63.

The header-detection means is embodied as a header-matched filter 79. The header-matched filter 79 detects, at the processing frequency, the header embedded in the SS-TDMA-spread-spectrum signal. The term "header-matched filter" as used herein, is a matched filter for detecting the header, by having an impulse response matched to the chip-sequence signal of the header of the SS-TDMA-spread-spectrum signal. The header-matched filter may be a digital-matched filter, a surface-acoustic-wave (SAW) device, software operating in a processor or embodied within an application specific integrated circuit (ASIC). In response to detecting the header, the header-matched filter 79 outputs a header-detection signal. The header-matched filter at a base station can detect the header embedded in the SS-TDMA-spread-spectrum signal from all users, since the chip-sequence signal for the header and data is common to all users.

The header-detection means alternatively may be embodied as a header-matched filter, coupled to an output of a data-matched filter or to the output of the multiplexer 80. This alternative is taught in U.S. Pat. No. 5,627,855, entitled PROGRAMMABLE TWO-PART MATCHED FILTER FOR SPREAD SPECTRUM by Davidovici, which is incorporated herein by reference.

The frequency locked loop 70 is frequency locked in response to the header-detection signal. The frequency locked loop 70 locks the frequency of the oscillator 63 to the carrier frequency of the received SS-TDMA-spread-spectrum signal. Circuits for frequency locked loops, and their operation, are well known in the art.

The processor means is embodied as a processor 90. The processor 90, in response to the header-detection signal, generates control and timing signals. The control and timing signals are used for controlling sequences and timing of the invention.

The receiver-spread-spectrum means is embodied as a plurality of data-matched filters 71, 78. Each of the plurality of data-matched filters 71, 78 has an impulse response matched to a chip-sequence signal of a respective one of the plurality of chip-sequence signals. The data-matched filters may be embodied as a digital-matched filter, SAW device, software operating in a processor, or an ASIC. The plurality of data-matched filters 71–78 despreads the multichannel-spread-spectrum signal of the SS-TDMA-spread-spectrum signal as the plurality of received spread-spectrum channels.

Alternatively, the receiver-spread-spectrum means and the transmitter-spread-spectrum means may be embodied as the plurality of data-matched filters 71, 78, thereby using the same hardware. The plurality of data-matched falters 71, 78 in this embodiment are time multiplexed with different coefficients, between transmit and receive.

Each chip-sequence signal in the plurality of chip-sequence signals is different, preferably orthogonal to each other, to avoid or reduce interference. The plurality of chip-sequence signals, however, preferably is common to all users. Thus, the plurality of data-matched filters 71, 78 can detect the plurality of chip-sequence signals from any of the users.

The multiplexing means is embodied as a multiplexer 80 and the decoding means is embodied as a receiver TDMA subsystem 81. The multiplexer 80 multiplexes the plurality of received spread-spectrum channels as the received-TDMA data. The received-TDMA data, in an error-free environment, is the same as the TDMA data that was generated at the SS-TDMA transmitter.

The receiver TDMA subsystem 81 selects the received-TDMA data within a particular time slot, or within a plurality of time slots, and outputs the received-TDMA data as received data. The selecting of the received-TDMA data within a particular time slot by the receiver TDMA subsystem 81, is what distinguished one user from another, since each user transmits TDMA data with a different time slot from the other users. For example, a first user and a second user may send first data and second data, respectively, using a first sequence of time slots and a second sequence of time slots, which are different from, and non-interfering with, each other, just like regular TDMA. A user may have more than one time slot assigned to the user.

A Costas loop is not required to lock onto phase, if the time slot is, by way of example, 80 to 160 microseconds and phase is constant. Thus, at a base station, the uplinks from the users assume that, within a time slot, phase does not change, even though ten milliseconds later, in a subsequent packet, phase can be different from a previous packet. The phase is assumed to not change only within a packet. The phase in the subsequent packet can be different.

The receiver-memory means is embodied as a receiver-first-in-first-out (receiver-FIFO) memory 82. The presence of data, which would be detected by the presence of a correct data sequence in the header or data portion of the SS-TDMA signal, would pass to the receiver-FIFO memory 82. A correct data sequence might be a particular combination of bits, indicating proper decoding. The receiver-FIFO memory 82 stores the received data and has the data present at an output.

The present invention also comprises a method for communicating data from a remote unit to a base terminal using spread-TDMA transmission. The method includes the steps of storing data in a memory of a remote unit and sending the data from the memory, in an assigned time slot, as TDMA data. The data are demultiplexed using a demultiplexer, into sub-data sequence signals. The method includes generating a plurality of chip-sequence signals, and multiplying each of the sub-data-sequence signals by a respective chip-sequence signal, thereby generating a plurality of spread-spectrum channels.

The steps include algebraically combining the plurality of spread-spectrum channels as a multichannel-spread-spectrum signal, concatenating a header to the multichannel-spread-spectrum signal to generate a SS-TDMA-spread-spectrum signal, and transmitting on a carrier frequency the SS-TDMA-spread-spectrum signal over a communications channel using radio waves.

The steps include, at a SS-TDMA receiver, translating the SS-TDMA-spread-spectrum signal from the carrier frequency to a processing frequency, and detecting, at the processing frequency, the header embedded in the SS-TDMA-spread-spectrum signal. The chip-sequence signal used for the header and the data is common to all uses. In response to detecting the header, the method includes outputting a header-detection signal and generating control and timing signals.

The steps also include despreading the multichannel-spread-spectrum signal of the SS-TDMA-spread-spectrum signal as a plurality of received spread-spectrum channels. The plurality of received spread-spectrum channels are multiplexed as received-TDMA data. The steps include selecting within a time slot of a sequence of time slots, the received-TDMA data as received data, and storing the received data in a memory for output to a data output.

The SS-TDMA system can be a wideband code division multiple access (W-CDMA) system, capable of transmitting, in a particular application, 9.6 megabits per second of data. For example, the following discussion assumes operation in the frequency band 2.4–2.483 GHz, although operation in other bands is possible. Preferred bandwidths are 26 MHz, available in Japan, and 70 MHz, for operation in USA, but again other bandwidths are possible. For example, IMT-2000 is considering bandwidths of 2×5, 2×10, 2×20 and probably 2×40 MHz.

In order to achieve a high processing gain at these bandwidths the data are demultiplexed. In FIG. 2, 19.2 megachips per second and a demultiplex factor of eight is employed for 26 MHz bandwidth operation.

The circuit operation of FIG. 2 is as follows:

| | |
|---|---|
| 1. | The data are entered mechanically or electrically into a transmitter-FIFO memory 41 and read out at a 9.6 megabits per second rate. |
| 2. | The data are sent by transmitter TDMA subsystem 42. Such techniques for generating TDMA data in a TDMA system are well known in the art. Each user has a different time slot. The TDMA data are demultiplexed into eight, 9.6/8 = 1.2 megabits per second sub-data-sequence signals. |
| 3. | Each bit is spread using a 16 chip/bit code. The chip-sequence signals $C_1$–$C_8$ are each orthogonal to one another, i.e., $C_i \cdot C_j = 0$, $i \neq j$. |

Obtaining orthogonal chip-sequence signals is well known. In a preferred embodiment, the standard procedure of taking a chip-sequence signal of length 15 is used and called g(i); the chip-sequence signal is shifted by n=1, 2, . . . , 15 to yield the chip-sequence signals g(i−n) n=1, . . . , 15. Each chip-sequence signal is of length 15 chips. Each chip-sequence signal is then increased by one chip by adding a zero chip as the last chip. Thus the chip-sequence signal g(i−n) contains 16 chips and chip-sequence signals for different n are orthogonal.

| | |
|---|---|
| 4. | The sub-data-sequence signals, i,e., the multichannel-spread-spectrum signal, are concatenated with a header by a header device 46. In this example the header is a chip-sequence signal, 3,360 chips long. |
| 5. | Each user has the same header and the same set of spreading chip-sequence signals. |
| 6. | The number of chips/bit can be any number e.g., 4, 8, 16, 32. The key is that different chip-sequence signals, $C_i \cdot C_j$, are orthogonal. This enhances processing gain (PG) for increased interference immunity. |

In other systems, only one user can transmit at a time and, if two users transmitted simultaneously, a collision may occur and SS-TDMA signals from both users will not be received correctly.

Clearly, two or three or more simultaneous transmissions depend only on the processing gain which is a design parameter and not fundamental to the present invention.

| | |
|---|---|
| 7. | The spread data is upconverted and amplified by transmitter-carrier subsystem 50 and transmitted. |

The received signal is amplified in a low noise amplifier (LNA) 61 and down-converted, by mixer 62 with a signal from a local oscillator 63, to baseband. The signal is then amplified by amplifier 64 and hard limited by a hard limiter. The amplifier 64 may include the hard limiter.

| | |
|---|---|
| 8. | The received signal is detected by the header-matched filter 79 and then by the plurality of data-matched filters 71, 78. The output of the header-matched filter 79 goes to the frequency locked loop (FLL) 70 to control the frequency. The frequency locked loop 70 design is standard as is known in the art. Analog designs also are possible. |
| 9. | The despread data are then multiplexed by multiplexer 80 and decoded by receiver TDMA subsystem 81. |
| 10. | Forward error correction (FEC) is not shown but can be employed. |
| 11. | The data can be stored in a receiver-FIFO memory 82 before outputting. |
| 12. | To minimize collisions, each receiver can read the matched filter output power using a signal power detector 87. When the power is low the user can transmit. When the power level is high, transmission is stopped. |
| 13. | The processor 90 handles all control and timing functions. |
| 14. | Matched filter acquisition and tracking are not shown for simplicity since techniques for these functions are well known in the art. |

QAM SS-TDMA System

The present invention also provides a new and novel spread-spectrum, SS-TDMA system, using a quadrature-amplitude-modulated (QAM) spread-spectrum signal. The QAM-spread-spectrum signal, in a preferred embodiment, includes a first header, followed in time by a first multichannel-spread-spectrum signal, and a second header, followed in time by a second multichannel-spread-spectrum signal. The first and second headers are concatenated with the first and second multichannel-spread-spectrum signals, respectively. The first and second headers are generated from spread-spectrum processing, by using techniques well known in the art, a header-symbol-sequence signal with a chip-sequence signal. The header-symbol-sequence signal is a predefined sequence of symbols. The header-symbol-sequence signal may be a constant value, i.e., just a series of 1-bits or symbols, or a series of 0-bits or symbols, or alternating 1-bits and 0-bits or alternating symbols, a pseudorandom symbol sequence, or other predefined sequence as desired. The chip-sequence signal is user-defined, and in a usual practice, is used with a header-symbol-sequence signal. The header, in a preferred embodiment, is a chip-sequence signal used for the purpose of synchronization.

Each spread-spectrum channel of the first and second multichannel-spread-spectrum signals part of the QAM-spread-spectrum signal is generated similarly, from techniques well known in the art as used for the header, by spread-spectrum processing a sub-data-sequence signal with a respective chip-sequence signal. The sub-data-sequence signal may be derived from data, or an analog signal converted to data, signalling information, or other source of data symbols or bits. The chip-sequence signal can be user-defined, and preferably is orthogonal to other chip-sequence signals used for generating the plurality of spread-spectrum channels.

In the QAM SS-TDMA system, each SS-TDMA transmitter includes transmitter-memory means, transmitter TDMA means, demultiplexer means, transmitter-spread-spectrum means, combiner means, header means, and transmitter-carrier means. The transmitter TDMA means is coupled to the transmitter-memory means. The demultiplexer means, which is coupled to the transmitter TDMA means, has a plurality of outputs. The transmitter-spread-spectrum means is coupled to the plurality of outputs of the demultiplexer means. The combiner means is coupled between the transmitter-spread-spectrum means and the header means.

The transmitter-memory means is coupled to a data input, and stores data from the data input. The transmitter TDMA means sends the data, within an assigned time slot, from the transmitter-memory means as TDMA data. The demultiplexer means demultiplexes the TDMA data into a first plurality of sub-data-sequence signals and a second plurality of sub-data-sequence signals, with a respective sub-data-sequence signal at a respective output of the demultiplexer means. The transmitter-spread-spectrum means spread-spectrum processes each of the first plurality of sub-data-sequence signals, and each of the second plurality of sub-data-sequence signals, with a respective chip-sequence signal. The output of the transmitter-spread-spectrum means is a first plurality of spread-spectrum channels and a second plurality of spread-spectrum channels, with each spread-spectrum channel corresponding to one of the outputs of the demultiplexer means. The combiner means algebraically combines the first plurality of spread-spectrum channels as a first multichannel-spread-spectrum signal, and the second plurality of spread-spectrum channels as a second multichannel spread-spectrum signal. The header means concatenates a first header to the first multichannel-spread-spectrum signal, and a second header to the second multichannel spread-spectrum signal. The first header and the second header are for chip-sequence synchronization. At the output of the header means is a first SS-TDMA-spread-spectrum signal and a second SS-TDMA-spread-spectrum signal. The transmitter-carrier means transmits, at a carrier frequency, the QAM-spread-spectrum signal, using radio waves, over a communications channel.

Each of the SS-TDMA receivers includes translating means, header-detection means, processor means, receiver-spread-spectrum means, multiplexing means, receiver TDMA means, and receiver-memory means. The translating means is coupled to the communications channel. The header-detection means is coupled between the receiver-spread-spectrum means and the processor means. The receiver-spread-spectrum means is coupled to the translating means and to the multiplexing means. The receiver TDMA means is coupled between the multiplexing means and the receiver-memory means. At the output of the receiver-memory means are the received data.

The translating means translates the received QAM-spread-spectrum signal from the carrier frequency to a processing frequency. The processing frequency may be a radio frequency (RF), an intermediate frequency (IF), a baseband frequency, or other desirable frequency for processing data.

The header-detection means detects, at the processing frequency, the first header and the second header embedded in the QAM-spread-spectrum signal. The header-detection means outputs, in response to detecting the first header and/or the second header, a header-detection signal.

The processor means generates control and timing signals. These signals are used for controlling sequences and timing of the invention.

The receiver-spread-spectrum means despreads the first multichannel spread-spectrum signal and the second multichannel spread-spectrum signal embedded in the QAM-spread-spectrum signal, as a first plurality of spread-spectrum signals and a second plurality of spread-spectrum signals. The multiplexing means multiplexes the first plurality of spread-spectrum signals and the second plurality of spread-spectrum signals as the received-TDMA data. The receiver TDMA means selects from a particular time slot the received-TDMA data and the receiver memory means stores the received-TDMA data from the receiver TDMA means and outputs the data.

Figure 3:
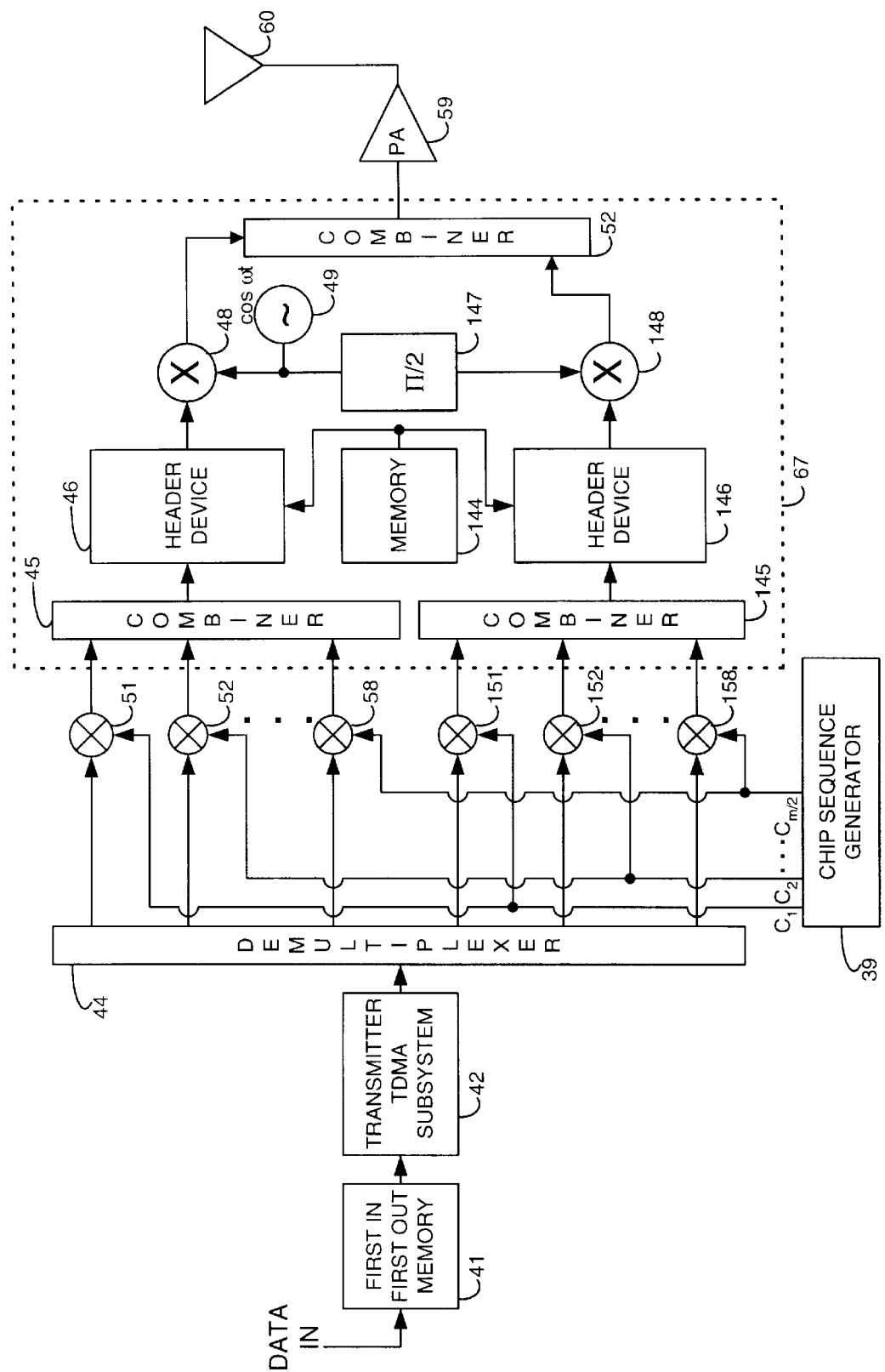
FIG. 3 is a block diagram of a SS-TDMA transmitter.

In the exemplary arrangement shown in FIG. 3, the transmitter-memory means is embodied as a transmitter-first-in-first-out (transmitter-FIFO) memory 41. The transmitter-FIFO memory 41 may employ random access memory (RAM) or other memory components as is well known in the art. The transmitter-FIFO memory 41 may be part of a digital signal processor (DSP); or, part of an application specific integrated circuit (ASIC).

For the case of an analog signal, an analog-to-digital converter would be inserted before the input to the transmitter-FIFO memory 41 for converting the analog signal to data. The analog-to-digital converter may convert an analog signal to one of a multilevel value, or may be a one bit analog-to-digital converter, i.e., a hard limiter.

The transmitter TDMA means is embodied as a transmitter TDMA subsystem 42. The transmitter TDMA subsystem 42 may be a TDMA circuit or device for transmitting data within a time slot of a TDMA system. Circuitry for TDMA subsystems are well known in the art for transmitting TDMA data.

The transmitter TDMA subsystem 42 sends the data from the transmitter-FIFO memory 41, as TDMA data. The TDMA process may include sending data within a particular time slot of a sequence time slot, as TDMA data, a particular data channel. The term "TDMA data," as used herein, broadly means data that are sent in a time slot of a transmitter TDMA system. The time slots of the TDMA data serve to distinguish a first QAM-spread-spectrum signal from a second QAM-spread-spectrum signal, by having the first QAM-spread-spectrum signal in a first time slot, and the second QAM-spread-spectrum signal in a second time slot.

The demultiplexing means is embodied as a demultiplexer 44. The demultiplexer 44 may be embodied as a serial-to-parallel converter. The outputs of the demultiplexer 44 are divided into a first plurality of outputs and a second plurality of outputs. Each output of the demultiplexer 44 has a demultiplexed portion of the encoded signal. As an example, the first plurality of outputs might include 64 outputs, and the second plurality of outputs might include 64 outputs.

The transmitter-spread-spectrum means is embodied as a chip-sequence means and a first plurality of product devices 51, 52, 58 and a second plurality of product devices 151, 152, 158. The chip-sequence means may be embodied as a chip-sequence generator 39 for generating a plurality of chip-sequence signals.

Alternatively, the transmitter-spread-spectrum means may be embodied as a plurality of EXCLUSIVE-OR gates, coupled between the plurality of outputs of the demultiplexer 44, and a memory device for storing the plurality of chip-sequence signals. In this embodiment, the memory device outputs a respective chip-sequence signal in response to the respective sub-data-sequence signal.

A third alternative may include having the transmitter-spread-spectrum means embodied as a memory device, with an appropriate detection circuit, so that in response to a particular data symbol or data bit at the output of a particular output of the demultiplexer, a chip-sequence signal is substituted for that data symbol or data bit. The transmitter-spread-spectrum means may also be embodied as other technology known in the art capable of outputting a plurality of chip-sequence signals.

The combining means is embodied as a first combiner 45 and a second combiner 145, the header means is embodied as a first header device 46 for concatenating a first header with a first multichannel-spread-spectrum signal and a second header device 146 for concatenating a second header with a second multichannel-spread-spectrum signal, and the transmitter-carrier means is embodied as a transmitter-carrier subsystem. A memory 144 may store the header used by first header device 46 and second header device 146. A memory for storing the header may be included as part of the first header device 46 and the second header device 146. Alternatively, a shift register with appropriate taps may generate the header, as is well known in the art.

The transmitter-carrier subsystem may include an oscillator 49 and in-phase multiplier device 48 for shifting a first multichannel-spread-spectrum signal to a carrier frequency, a quadrature-phase multiplier device 148 coupled through a 90° phase shift device 147 to the oscillator 49 for shifting a second multichannel-spread-spectrum signal to a carrier frequency, a combiner 52 and a power amplifier 59 and/or other circuitry as is well known in the art for transmitting a signal over a communications channel. The QAM-spread-spectrum signal is transmitted using an antenna 60. The QAM modulator 67 comprises the elements within the dashed lines.

As shown in FIG. 3, the transmitter TDMA subsystem 42 is coupled between the transmitter-FIFO memory 41 and the demultiplexer 44. The chip-sequence generator 39 is coupled to the first plurality of product devices 51, 52, 58, and to the second plurality of product devices 151, 152, 158. The first combiner 45 is coupled between the first plurality of product devices 51, 52, 58 and the first header device 46, and the first header device 46 is coupled to the in-phase multiplier device 48. The second combiner 145 is coupled between the second is plurality of product devices 151, 152, 158 and the second header device 146, and the second header device 146 is coupled to the quadrature-phase multiplier device 148.

The transmitter-FIFO memory 41 receives data from a data input, and stores the data. The first data stored in the transmitter-FIFO memory 41 are the first data outputted from the transmitter-FIFO memory 41.

The transmitter TDMA subsystem 42 sends the data from the transmitter-FIFO 41 as TDMA data. The transmitter TDMA subsystem 42 sends the data in a particular time slot.

The transmitter TDMA subsystem 42 is necessary for distinguishing data from different users. By having the proper time slot for receiving the TDMA data, data from a particular user are distinguished from data from other users. Thus, the use of different time slots in the TDMA subsystem is what defines a user's channel, unlike other multichannel spread-spectrum systems, where a user's channel is defined by a particular chip-sequence signal. By sending the data with transmitter TDMA subsystem 42, a common set of chip-sequence signals can be used by all users for the CDMA subsystem, reducing the cost of having matched filters or correlators changing to different chip-sequence signals. The reduced cost is achieved since, at a receiver, different sets of matched-filters or correlators are not required for each user but instead one set of matched filters or correlators is required for despreading the multichannel-spread-spectrum signal from all users.

The demultiplexer 44 demultiplexes the TDMA data into a first plurality of sub-data-sequence signals and a second plurality of sub-data-sequence signals, with a respective sub-data-sequence signal at a respective output of the demultiplexer 44. Typically, the number of the first plurality of sub-data-sequence signals are half of the total number of data-sequence signals outputted from the demultiplexer 44, and the second plurality of sub-data-sequence signals are the other half of the data-sequence signals outputted from the demultiplexer 44.

The chip-sequence generator 39 generates a plurality of chip-sequence signals. Each of the chip-sequence signals of the plurality of chip-sequence signals has low correlation with the other chip-sequence signals in the plurality of chip-sequence signals, and is preferably orthogonal to the other chip-sequence signals in the plurality of chip-sequence signals.

The chip sequences used for data spreading are not necessarily pseudonoise sequences. The chip sequences may be derived from the Gold codes, pseudonoise sequences, quadrature residue codes, etc. In order to make the Gold code, etc., orthogonal, each shift of the original Gold code is augmented with a 1. Walsh functions are not preferred because they repeat.

In FIG. 3, the first plurality of product devices 51, 52, 58, and the second plurality of product devices 151, 152, 158, for example, may be embodied as a plurality of EXCLUSIVE-OR gates coupled between the plurality of outputs of the demultiplexer 44 and the chip-sequence means. Each EXCLUSIVE-OR gate multiplies a respective sub-data-sequence signal from the demultiplexer, by a respective chip-sequence signal from the chip-sequence generator 39.

The first plurality of product devices 51, 52, 58 multiplies each of the first plurality of sub-data-sequence signals by a respective chip-sequence signal from chip-sequence generator 39. At the output of the first plurality of product devices 51, 52, 58 is a first plurality of spread-spectrum channels, respectively. The second plurality of product devices 151, 152, 158 multiplies each of the second plurality of sub-data-sequence signals by a respective chip-sequence signal from chip-sequence generator 39. At the output of the second plurality of product devices 151, 152, 158 is a second plurality of spread-spectrum channels, respectively. A particular spread-spectrum channel is identified by the chip-sequence signal that was used to spread-spectrum process the particular sub-data sequence signal. The plurality of chip-sequence signals used to multiply the first plurality of sub-data-sequence signals may be used to multiply the second plurality of sub-data-sequence signals. Alternatively, a first plurality of chip-sequence signals may be used to multiply the first plurality of sub-data-sequence signal, and a second plurality of chip-sequence signals may be used to multiply the second plurality of sub-data-sequence signals, with the first plurality of chip-sequence signals different from the second plurality of chip sequence signals.

The first combiner 45 algebraically combines the first plurality of spread-spectrum channels, and outputs the combined signal as a first multichannel-spread-spectrum signal. Preferably, the first combiner 45 combines the first plurality of spread-spectrum channels linearly, although some nonlinear process may be involved without significant degradation in system performance.

The second combiner 145 algebraically combines the second plurality of spread-spectrum channels, and outputs the combined signal as a second multichannel-spread-spectrum signal. Preferably, the second combiner 145 combines the first plurality of spread-spectrum channels linearly, although some nonlinear process may be involved without significant degradation in system performance.

The first header device 46 concatenates a first header to the first multichannel-spread-spectrum signal. At the output of the first header device 46 is the first SS-TDMA-spread-spectrum signal. The first header is for chip-sequence synchronization at the receiver.

The second header device 146 concatenates a second header to the second multichannel-spread-spectrum signal. At the output of the second header device 146 is the second SS-TDMA-spread-spectrum signal. The second header is for chip-sequence synchronization at the receiver.

The in-phase multiplier device 48 shifts the first SS-TDMA-spread-spectrum signal to a carrier frequency, as an in-phase component of the carrier frequency. The quadrature-phase multiplier device 148 shifts the second SS-TDMA-spread-spectrum signal to the carrier frequency, as a quadrature-phase component.

The combiner 52 combines the first SS-TDMA-spread-spectrum signal, as the in-phase component, and the second SS-TDMA-spread-spectrum signal, as the quadrature-phase component, to generate a QAM-spread-spectrum signal. The transmitter transmits, at the carrier frequency, the QAM-spread-spectrum signal using radio waves over a communications channel. The transmitter-carrier subsystem of the SS-TDMA transmitter includes appropriate filters, power amplifiers 59 and matching circuits coupled to an antenna 60. The transmitter-carrier subsystem also may include a hard limiter, for hard limiting the SS-TDMA-spread-spectrum signal before transmitting.

Figure 4:
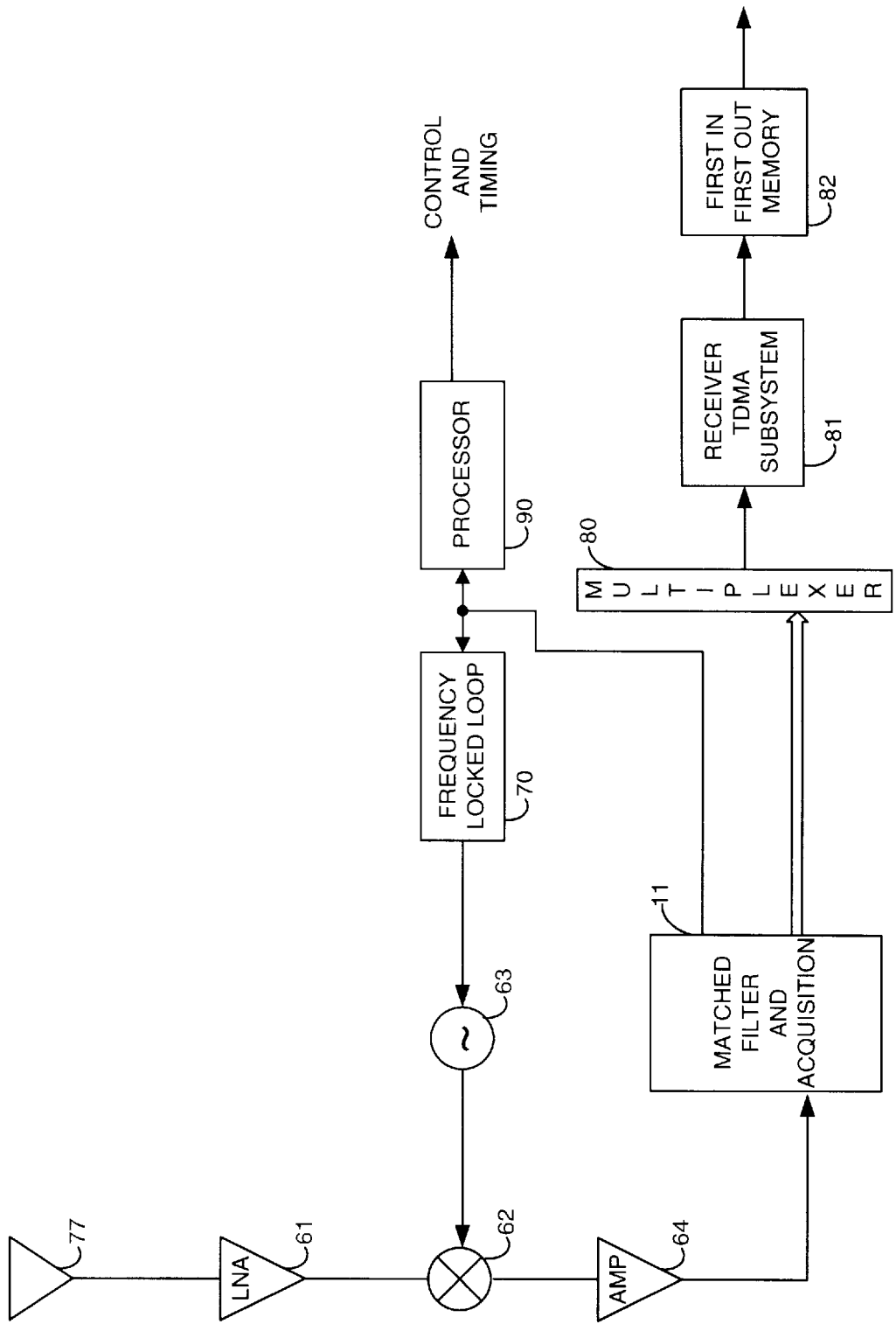
FIG. 4 is a block diagram of a SS-TDMA receiver.

At the receiver, as shown in FIG. 4, the translating means is shown as a translating device 62 with oscillator 63 and frequency locked loop 70, the header-detection means is embodied as a plurality of header-matched filters, which are within the matched-filter-and-acquisition subsystem 11. The header-detection means alternatively may be a header-matched filter 79 of FIG. 2, within the matched-filter-and-acquisitions subsystem 11. The processor means is embodied as a processor 90, the receiver-spread-spectrum means includes a plurality of data-matched filters, which are within the matched-filter-and-acquisition subsystem 11, the multiplexing means is embodied as a multiplexer 80 and the receiver TDMA means is embodied as a receiver TDMA subsystem 81. The receiver-memory means is embodied as a receiver-first-in-first-out (receiver-FIFO) memory 82.

The translating device 62 is coupled through an antenna 77 to the communications channel and through an amplifier 64 to the matched-filter-and-acquisition-subsystem 11. The translating device 62 is coupled to the oscillator 63, and the oscillator 63 is coupled to frequency locked loop 70. The plurality of header-matched filters within the matched-filter-and-acquisition subsystem 11 are coupled to the frequency locked loop 70. The processor 90 is coupled to the header-matched filters within the matched-filter-and-acquisition subsystem 11. The first and second pluralities of data-matched filters within the matched-filter-and-acquisition subsystem 11 are coupled between the translating device 62 and the multiplexer 80. The receiver TDMA subsystem 81 is coupled between the multiplexer 80 and the receiver-FIFO memory 82.

The translating device 62 translates the received QAM-spread-spectrum signal from the carrier frequency to a processing frequency. The translating device 62 may be a mixer, which is well known in the art, for shifting an information signal, which in this disclosure is the received QAM-spread-spectrum signal, modulated at a carrier frequency to IF or baseband. The processing frequency may be RF, IF, at baseband frequency or other desired frequency for a digital signal processor. The signal for shifting the received QAM-spread-spectrum signal is produced by the oscillator 63. The QAM-spread-spectrum signal is processed into an in-phase component and a quadrature-phase component.

Figure 5:
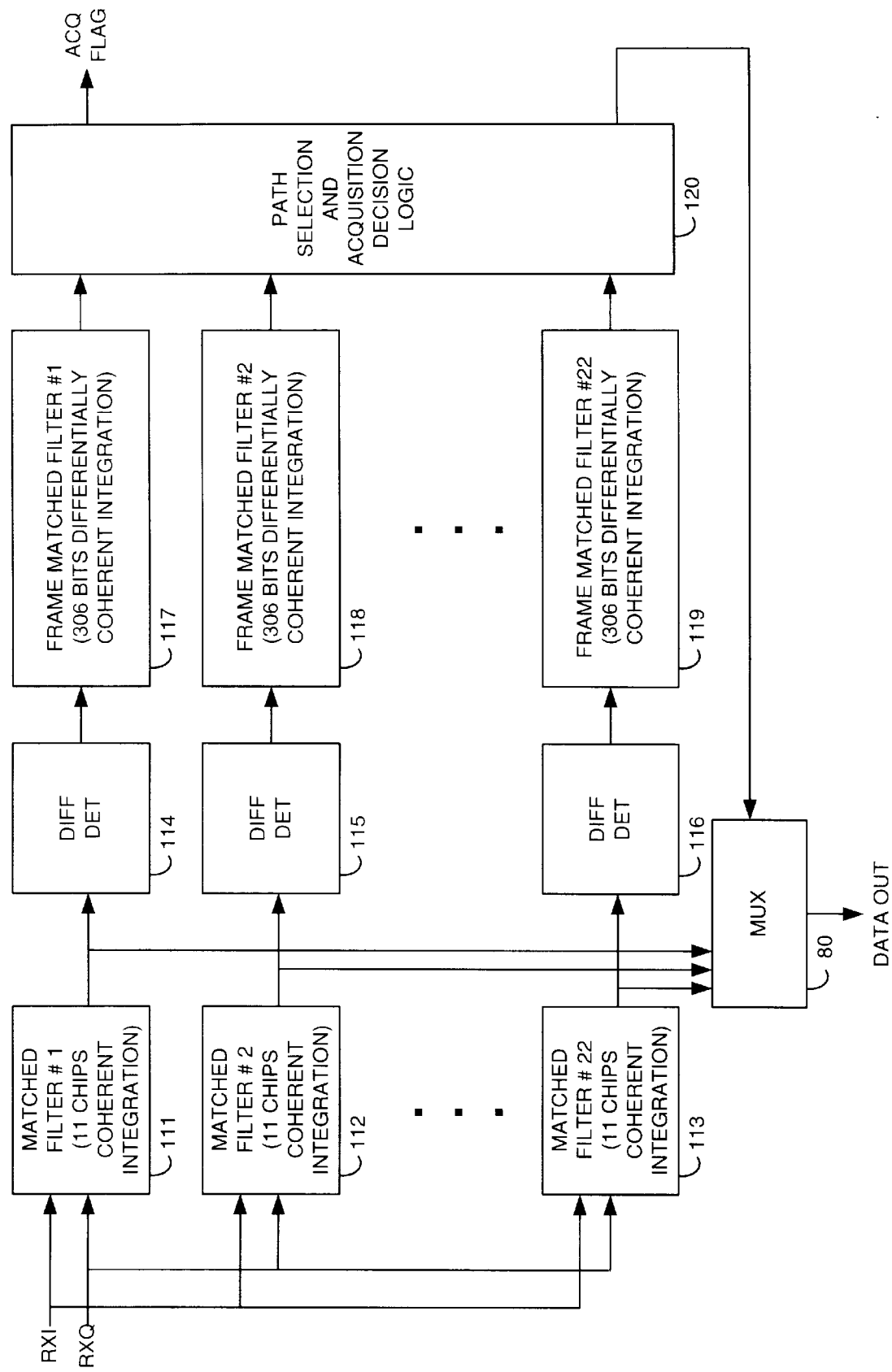
FIG. 5 is a block diagram of a matched-filter-and-acquisition subsystem as used in FIG. 4.

The matched-filter-and-acquisition circuit 11 may include a plurality of data-matched filters 111, 112, 113 and a plurality of header-matched-filter integrators 117, 118, 119, as shown in FIG. 5. The plurality of data-matched filters 111, 112, 113 is coupled through a plurality of differential detectors 114, 115, 116 to the plurality of header-matched-filter integrators 117, 118, 119, respectively. The plurality of header-matched-filter integrators 117, 118, 119 is coupled to path and acquisition decision logic 120. The outputs of the path and acquisition decision logic 120 and the plurality of data-matched filters 111, 112, 113 are coupled through a multiplexer 80. The plurality of data-matched filters 111, 112, 113 and the plurality of header-matched-filter integrators 117, 118, 119 include matched filters for the in-phase and quadrature-phase components of the QAM-spread-spectrum signal. The concept of a data-matched filter and a header-matched filter is taught in U.S. Pat. No. 5,627,855, entitled PROGRAMMABLE TWO-PART MATCHED FILTER FOR SPREAD SPECTRUM by Davidovici, which is incorporated herein by reference.

The plurality of data-matched filters 111, 112, 113 has a plurality of impulse responses, respectively matched to the plurality of chip-sequence signals generated by chip-sequence generator 39. The plurality of data-matched filters 111, 112, 113 may be embodied as a plurality of digital-matched filters, a plurality of SAW devices, software operating in a processor or an ASIC. The plurality of data-matched filters 111, 112, 113 detects, from the in-phase component, the first plurality of spread-spectrum channels embedded in the QAM-spread-spectrum channels embedded in the QAM-spread-spectrum signal. The detected first plurality of spread-spectrum channel is the first plurality of sub-data-sequence signals, respectively. The plurality of data-matched filters 111, 112, 113 detects, from the quadrature-phase component, the second plurality of spread-spectrum channels. The detected second plurality of spread-spectrum channels is the second plurality of sub-data-sequence signals, respectively. The first plurality of spread-spectrum channels are in the in-phase component of the QAM-spread-spectrum signal, and the second plurality of spread-spectrum channels are in the quadrature-phase component of the QAM-spread-spectrum signal, as described previously.

In FIG. 5, the plurality of header-matched-filter integrators 117, 118, 119 integrate and detect, at the processing frequency, the first header, from the in-phase component, and the second header, from the quadrature-phase component, embedded in the QAM-spread-spectrum signal. The header-matched-filter integrator can integrate and detect the first header and the second header embedded in the QAM-spread-spectrum signal from all users, since the chip-sequence signal and the bit signal for the first header and the second header and data is common to all users.

The term "header-matched-filter integrator," as used herein, is one or more matched-filter integrators for detecting the first header and the second header. The plurality of header-matched-filter integrators 117, 118, 119 may be embodied as a plurality of digital-matched-filter integrators, software operating in a processor, or an ASIC. In response to detecting the first header and the second header, the header-matched-filter integrator outputs a header-detection signal. Only one of the first header or the second header, however, needs to be detected to output the header-detection signal.

The path-selection-and-acquisition-decision logic 120 selects, and acquires lock, to a detected path of the QAM-spread-spectrum signal, from the plurality of header-matched-filter integrators 117, 118, 119, and outputs an acquisition signal. The acquisition signal passes through the multiplexer 80.

After acquisition of a packet, data are detected from the plurality of data-matched filters 111, 112, 113, and are outputted through multiplexer 80.

Figure 6:
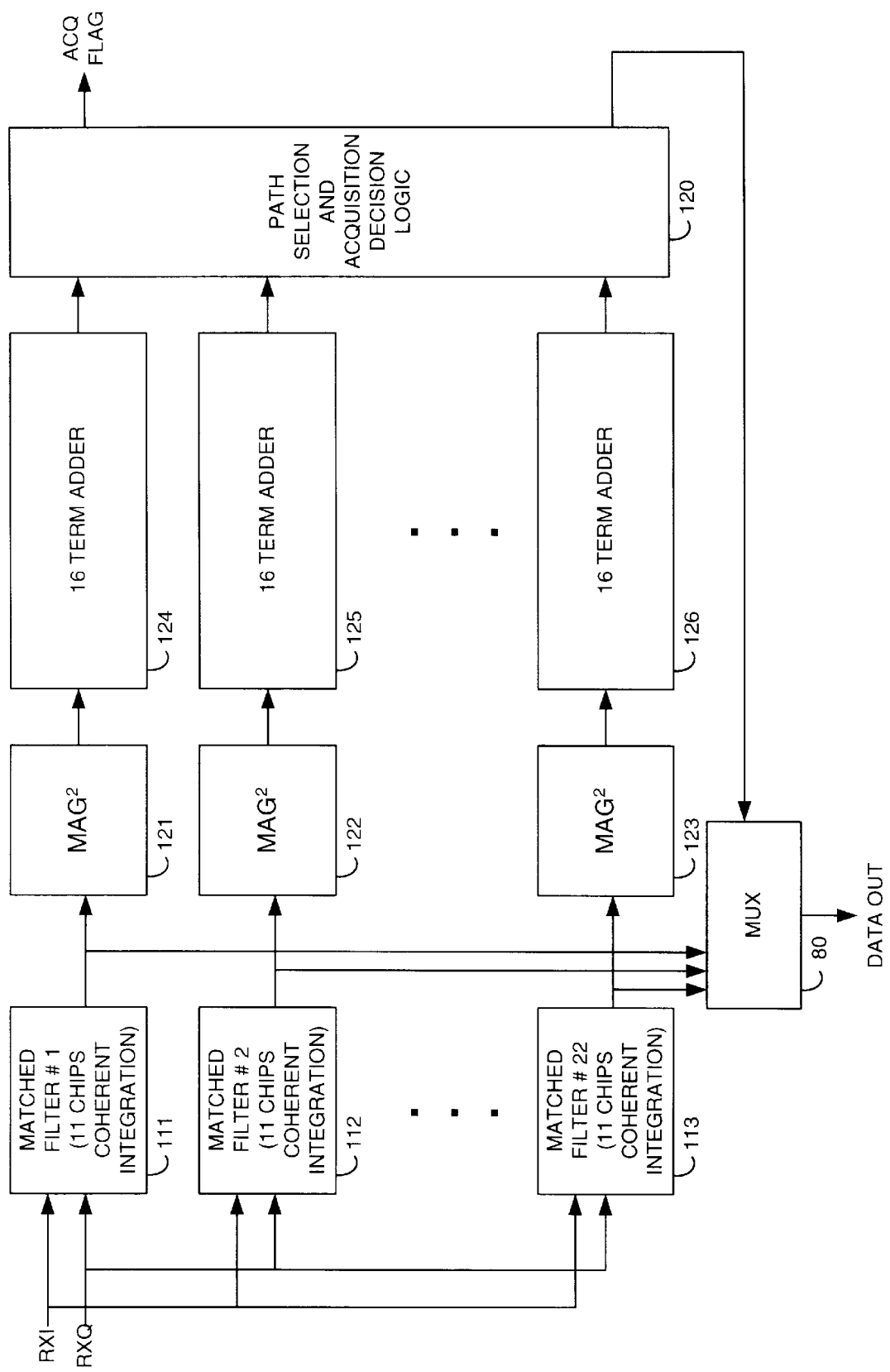
FIG. 6 is a block diagram of an alternative matched-filter-and-acquisition subsystem as used in FIG. 4.

An alternative for the matched-filter-and-acquisition circuit 11 is shown in FIG. 6. The plurality of data-matched filters 111, 112, 113 of FIG. 6 operates the same as those in FIG. 5. The plurality of header-matched-filter integrators 117, 118, 119 of FIG. 5, however, is replaced by a plurality of absolute-value differential detectors 121, 122, 123 connected to a plurality of adders 124, 125, 126, respectively. The plurality of absolute-value differential detectors 121, 122, 123 determine a magnitude of each bit of the first header and the second header, and the plurality of adders 124, 125, 126 effectively add up, or integrate, the magnitudes of the bits of the first header and the second header. The path-selection-and-acquisition-decision logic 120 works as described in connection with FIG. 5.

The packet receiver of FIGS. 4 and 5 or 6 may be modified by using the header-matched filter, as disclosed in FIG. 2. Similarly, the packet receiver of FIG. 2 may be modified by using the header-matched filter integrators disclosed in FIG. 5 or the absolute-value differential detectors of FIG. 6.

The frequency locked loop 70 is frequency locked in response to the header-detection signal. The frequency locked loop 70 locks the frequency of the oscillator 63 to the carrier frequency of the received QAM-spread-spectrum signal. Circuits for frequency locked loops, and their operation, are well known in the art.

The processor 90, in response to the header-detection signal, generates control and timing signals. The control and timing signals are used for controlling sequences and timing of the invention.

Each chip-sequence signal in the plurality of chip-sequence signals is different, one from another. The plurality of chip-sequence signals, however, is common to all users. Thus, the plurality of data-matched filters 111, 112, 113 can detect the plurality of chip-sequence signals from any of the users.

The multiplexer 80 multiplexes the first plurality of received spread-spectrum channels and the second plurality of received spread-spectrum signals as the received-TDMA data. The received-TDMA data, in an error-free environment, is the same as the TDMA data that was generated at the SS-TDMA transmitter. The multiplexer 80 may be embodied as a parallel-to-serial converter.

The receiver TDMA subsystem 81 selects from a time slot, the received-TDMA data as the received data. The use of time slots is what distinguishes one user from another, since each user transmits with a different time slot from a sequence of time slots.

If the receiver TDMA subsystem 81 were set to receive with the first time slot, then the first data would appear at the output of receiver TDMA subsystem 81. Data in other time slots would not appear at the output of receiver TDMA subsystem 81. The presence of data in other time slots, would be rejected by the receiver TDMA subsystem 81. The presence of data within a first time slot, would pass to the receiver-FIFO memory 82. The receiver-FIFO memory 82 stores the received data and has the data present at an output.

The present invention has a matched filter based implementation that permits fast acquisition, can perform coherent as well as differentially coherent detection of the incoming data. The incoming data are either BPSK, QPSK, or QAM modulated. At the receiver the plurality of data-matched filters separates the individual components that are QAM signals.

The present invention incorporates a fast acting automatic gain control (AGC) circuit that ensures the analog-to-diaital converter receives proper level signals. The ACC is adaptive; it can quickly adapt in actual operation to changes in signal levels and modulation formats.

In a preferred embodiment, the TDMA portion uses a frame having 128 time-slots. The frame lasts 10 milliseconds. A different number of time slots and frame durations are, of course, useable. The time slot may include a packet from a user. The packet, by way of example, may include a header, FEC coding, and maintenance information. Within a time slot, guard time is the transmission uncertainty due to near-far propagation delay considerations. Each packet contains 1536 bits, which are demultiplexed into 128 sub-data sequence signals, increasing processing gain to 64. Each sub-data-sequence signal has 12 bits, so that the entire packet has 12×128=1536 bits. During the guard time, there is no transmission.

Each of the 128 chip-sequence signals for spread-spectrum processing the 128 sub-data sequence signals, can be used by each of the users in each sector. A sector is a geographical area covered by a base station. In order to minimize cross-correlation interference between users of nearby sectors, each sector employs a second, long, pseudorandom sequence having in-phase and quadrature-phase components, $C_1$ and $C_2$. The in-phase and quadrature-phase components of the pseudorandom sequence, $C_1$ and $C_2$, are different chip-sequence signals for different sectors.

The present invention also comprises a method. The method includes, at a remote unit, the steps of storing data in a memory and sending the data from the memory in an assigned time slot as TDMA data. The data are demultiplexed using a demultiplexer, into a first plurality of sub-data sequence signals and a second plurality of sub-data-sequence signals. The method includes generating, at the remote unit, a plurality of chip-sequence signals, and multiplying each of the first plurality of sub-data-sequence signals by a respective chip-sequence signal, thereby generating a first plurality of spread-spectrum channels. The method includes generating a plurality of chip-sequence signals, and multiplying each of the second plurality of sub-data-sequence signals by a respective chip-sequence signal, thereby generating a second plurality of spread-spectrum channels.

The steps include algebraically combining, at the remote unit, the first plurality of spread-spectrum channels as a first multichannel-spread-spectrum signal, and concatenating a first header to the first multichannel-spread-spectrum signal to generate a first SS-TDMA-spread-spectrum signal. The steps include algebraically combining the second plurality of spread-spectrum channels as a second multichannel-spread-spectrum signal, and concatenating a second header to the second multichannel-spread-spectrum signal to generate a second SS-TDMA-spread-spectrum signal. The steps include transmitting on a carrier frequency the first SS-TDMA-spread-spectrum signal and the second SS-TDMA-spread-spectrum signal as a QAM-spread-spectrum signal, over a communications channel using radio waves.

The method steps further include, at the base terminal, translating the QAM-spread-spectrum signal from the carrier frequency to a processing frequency, and detecting, at the processing frequency, the first header and second header embedded in the QAM-spread-spectrum signal. The chip-sequence signal used for the first header and the second header and the data is common to all users. In response to detecting the first header and the second header, the method includes outputting, at the base terminal, a header-detection signal and generating control and timing signals. The steps also include despreading the first multichannel-spread-spectrum signal of the QAM-spread-spectrum signal as a first plurality of received spread-spectral channels. The steps also include despreading the second multichannel-spread-spectrum signal of the QAM-spread-spectrum signal as a second plurality of received spread-spectrum channels. The first plurality of received spread-spectrum channels and the second plurality of received spread-spectrum signals are multiplexed as received-TDMA data. At the base terminal, the steps further include selecting, from a time slot, the received-TDMA data as received data, and storing the received data in a memory for output to a data output.

The method may further comprise the step of, at the base terminal, sending data to the remote unit within a spread-spectrum CDMA signal. The remote unit receives the CDMA signal and recovers the data by despreading and multiplexing the CDMA signal.

In the present invention, assume that a 1536 bit packet is transmitted in one of 128 time slots at the rate of 7.3728 Mb/s. This signal is first demultiplexed, FIG. 3, into K channels, where K=128 in a preferred system, although any K will suffice. As a result, if K=128, and the chip rate is 9.8304 Mchips/s, then the transmitted rate in each channel is 153.6 kb/s and the processing gain is 64. Each of these K channels is spread using a different orthogonal spread-spectrum code of length L. Thus, $$\int_0^{T_L} C_i(t)C_j(t)dt = \begin{matrix} 1 & i=j \\ 0 & i \neq j \end{matrix}$$

over the time $T_L$ corresponding to the codelength L.

Further, the length L of each of the K orthogonal codes must be such that $L \geq K$, since there are only L orthogonal codes of length L.

In FIG. 3, one-half of the codes are sent on the in-phase (I) channel and one-half on the quadrature-phase (Q) channel forming quadrature-phase-shift-keying modulation (QPSK) or OQPAK. Binary-phase-shift-keying modulation (BPSK) can also be used. These are standard modulation procedures well known in the prior art.

Different sectors and different cells should use different orthogonal chip sequences to minimize interference between sectors and cells. This is done by multiplying each chip sequence $C_i$ by a chip sequence $g_j(t)$. Within a sector, every user uses the same codeset $C_i$ and $g_j$. Within each sector of each cell, each user uses the same codeset $C_i$ but, each sector in each cell gets a different $g_j$.

Users transmitting at different rates use a subset of one or more times slots so that the processing gain remains a constant. A random packet may be sent during any empty time slot. The availability of the empty slots are broadcast by the base station to the remote units, in an signaling or overhead channel.

W-CDMA and SS-TDMA Systems

The following analysis compares a wireless telecommunication system employing wideband CDMA (W-CDMA) transmission from a remote unit to a base station and from the base station to the remote unit, with a system employing SS-TDMA transmission from the remote unit to the base station while using W-CDMA transmission from the base station to the remote unit. The systems are compared on the basis of capacity in a multipath, multiple cell, environment and on the basis of complexity. The spread-spectrum receivers employed in both systems use matched filters, which permit connectionless as well as connection-based packet switched communications at data rates of up to 5.4 Mb/s, for multimedia or local area network (LAN) applications, as well as voice communications.

The wideband CDMA (W-CDMA) systems described herein can operate in a connection-oriented ISDN or ATM system providing either circuit-switched or packet-switched operation. The W-CDMA systems can also be used as a connectionless packet-switched communication. These systems are designed so that their respective wideband common air interfaces will be capable of carrying wired-line quality voice, high-speed fax, video and multimedia traffic. Basic rate ISDN at 144 kbps, compressed video at 384 kpbs, and ATM-packet switched data operation at data rates of up to 12 Mbps are achievable. The W-CDMA systems described herein may include a wireless telecommunication system employing W-CDMA transmissions from a remote unit to a base as well as from the base to the remote unit. The W-CDMA systems may also include a wireless telecommunications system employing spread-TDMA transmission from the remote unit to the base while using W-CDMA transmission from the base to the remote unit. Vehicular, pedestrian and fixed environments are all accommodated in either of these systems so that one terminal meets all the needs.

To accomplish these tasks, wideband spreading is selected to achieve high interference immunity as well as high capacity when transmitting high quality voice, data, video and multimedia. The system hardware features a digital matched-filter-based spread-spectrum receiver capable of the very short synchronization times required for packet switching. The spread spectrum receivers employed in both systems employ matched filters, which permit connectionless as well as connection-based packet-switched communications at data rates of up to 5.4 Mb/s, for multimedia or LAN applications, as well as voice communications.

W-CDMA/W-CDMA System

The basic W-CDMA design relies upon direct spreading of a single carrier on both the forward and reverse links to minimize multipath interference. The design uses BPSK/FDD and can have a bandwidth of 5, 10, 15, or 20 MHz (in each direction). Within packetized channels, the header is used for synchronization in packet-switched and circuit-switched modes of operation.

Different orthogonal codes are used for different sectors and for different cells. While the system has a frequency reuse of one, a code reuse of seven cells with six sectors per cell is anticipated. There is no synchronization of base stations; the common air interface (CAI) operates asynchronously. The system employs forward error correction (FEC) at a rate of ½ and a constraint length of seven, with convolutional coding in each direction. The resulting system has very fast power control (approximately 1700 updates/sec) in both the forward and reverse directions, and is battery efficient, with the remote unit awakening for 10–20 ms every two seconds to acquire and listen for incoming calls.

The forward link, i.e., the link from the base station to the remote unit, contains data-bearing information channels and a traffic channel. The traffic channel contains paging, call set-up, code dissemination and maintenance information. The information channels contain coded data, CRC, APC, ATC, signaling, maintenance information, etc. All channels are orthogonal and employ orthogonal, modified-quadratic residue codes. A rake receiver may be used. Automatic power control is fast, with an update every 605 $\mu$s, corresponding to 0.64 inches at 60 mph. The link uses BPSK/FDD, with all data rates accommodated. Forward error correction has a rate of ½ and a constraint length of K=7, with convolutional coding.

On the forward link, the user synchronizes to the header of each transmitted packet. Up to 192 orthogonal codes may be employed in any sector, with each sector and each cell employing different codes. Automatic Timing Control (ATC) is used to orthogonalize the reverse transmission, with an update every 605 $\mu$s.

Figure 7:
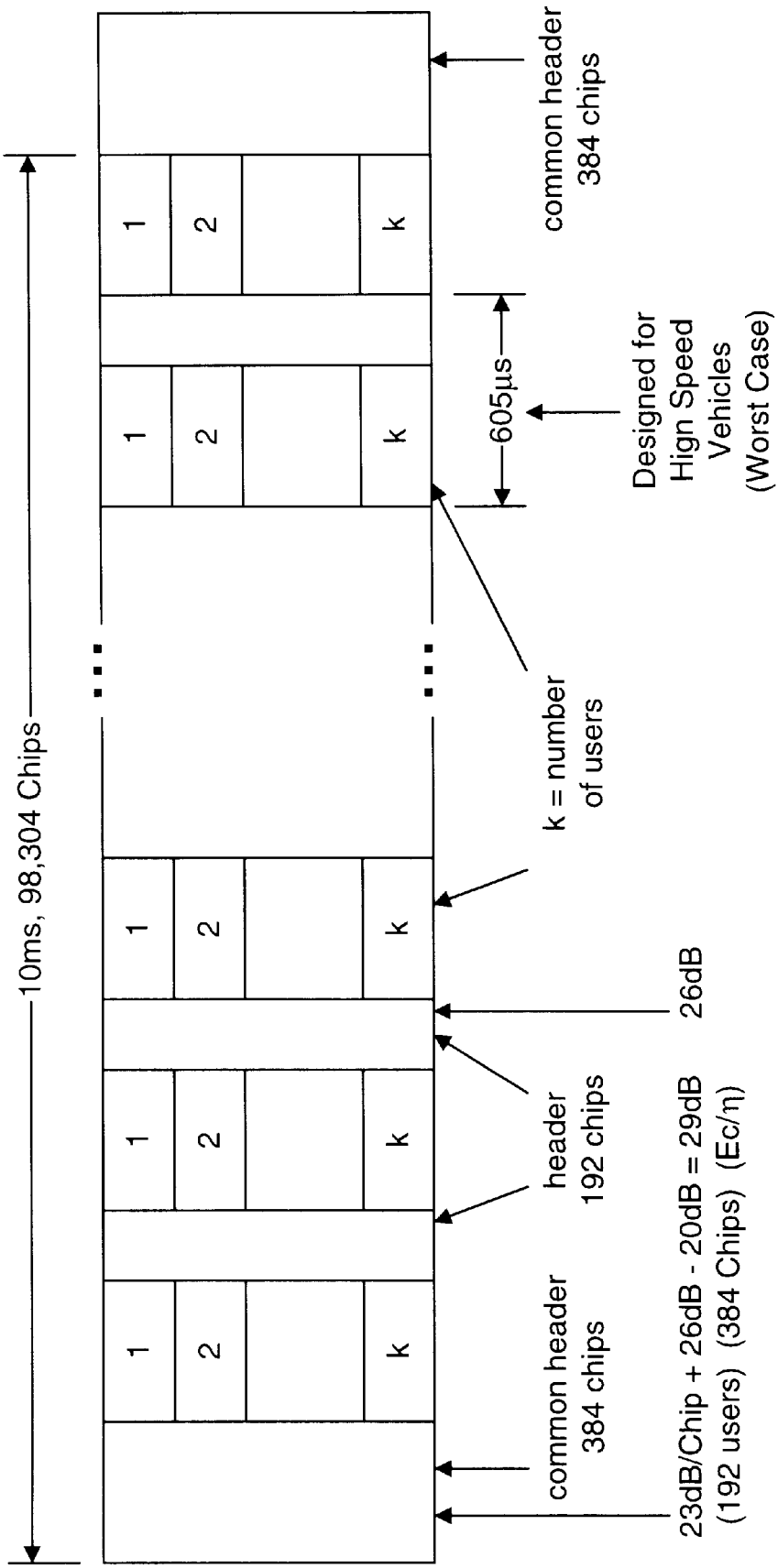
FIG. 7 shows a base to remote unit transmission of a W-CDMA/W-CDMA system where K chip-sequence signals, which define K channels, are transmitted in parallel.

An example, illustrated in FIG. 7, will be used to show that K chip-sequence signals are transmitted in parallel. Assume a maximum capacity of 192, 16 kbps users, including the access channel. If (Es/$\eta$)/Channel=3 dB, and the Processing Gain (PG) is 192, then Ec/$\eta$=Es/$\eta$-PG=−20 dB, with $\eta$ being the total noise, including interference. Examples may be drawn for fixed, pedestrian, and vehicular traffic.

One of the K chip-sequence signals is the access chip sequence signal which provides paging, code dissemination, etc. The other chip-sequence signals are distributed among the users, depending on their data needs. In this system, K=192 (approximately 23 dB) and therefore the S/I ratio in the header is 29 dB. The frame lasts for 10 ms and acquisition of the signal by each terminal occurs each frame. In the "sleep mode," while the remote unit waits for a call, the remote unit turns on every two seconds, i.e., every 200 frames, synchronizes to the 384 chip header and demodulates the frame, without delay. When the remote unit is not being paged, it "sleeps" for another two seconds before reawakening.

Figure 8:
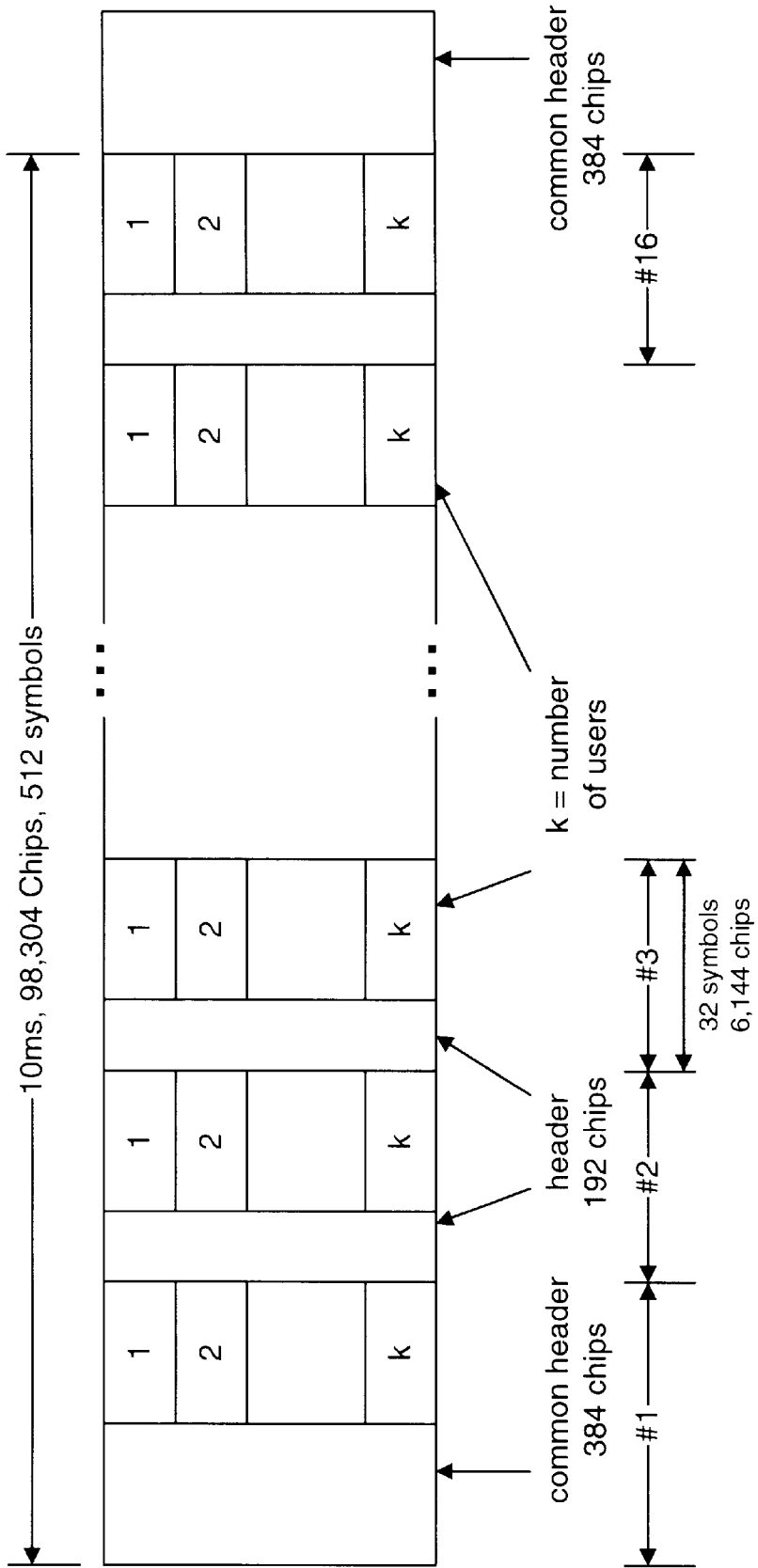
FIG. 8 shows a base to remote unit transmission of a W-CDMA/W-CDMA system with each chip-sequence signal having 6144 chips.

As shown in FIG. 8, the chip-sequence signal is 32 symbols in length and repeats 16 times per frame. The chip-sequence signal consists of a long code, $C_j$, of 6,144 chips which multiplies a short code of 192 chips. Each user in a sector of a cell receives one or more of these 192 short chip-sequence signals. These chip-sequence signals are orthogonal to one another. To differentiate between users in different sectors and cells, different chip-sequence signals, $C_j$, are used. The processing gain is 192.

Table I shows the data rates possible and the number of orthogonal codes given to a user operating at each of the data rates.

TABLE I

| Information Rate (kbps) | Information + FEC | Number of Codes | Hdrs.* | CRC | APC + ATC** | Maint. |
|---|---|---|---|---|---|---|
| 16 | 160 × 2 = 320 | 1 | 17 | 16 | 96 | 63 |
| 32 | 320 × 2 = 640 | 2 | 34 | 32 | 96 | 222 |
| 64 | 640 × 2 = 1280 | 3 | 51 | 32 | 96 | 77 |
| 144 | 1440 × 2 = 2880 | 7 | 119 | 32 | 96 | 457 |
| 384 | 3840 × 2 = 7680 | 16 | 272 | 32 | 96 | 112 |

*16 updates every 10 ms
**APC and ATC employ 3 symbols/update

Figure 9:
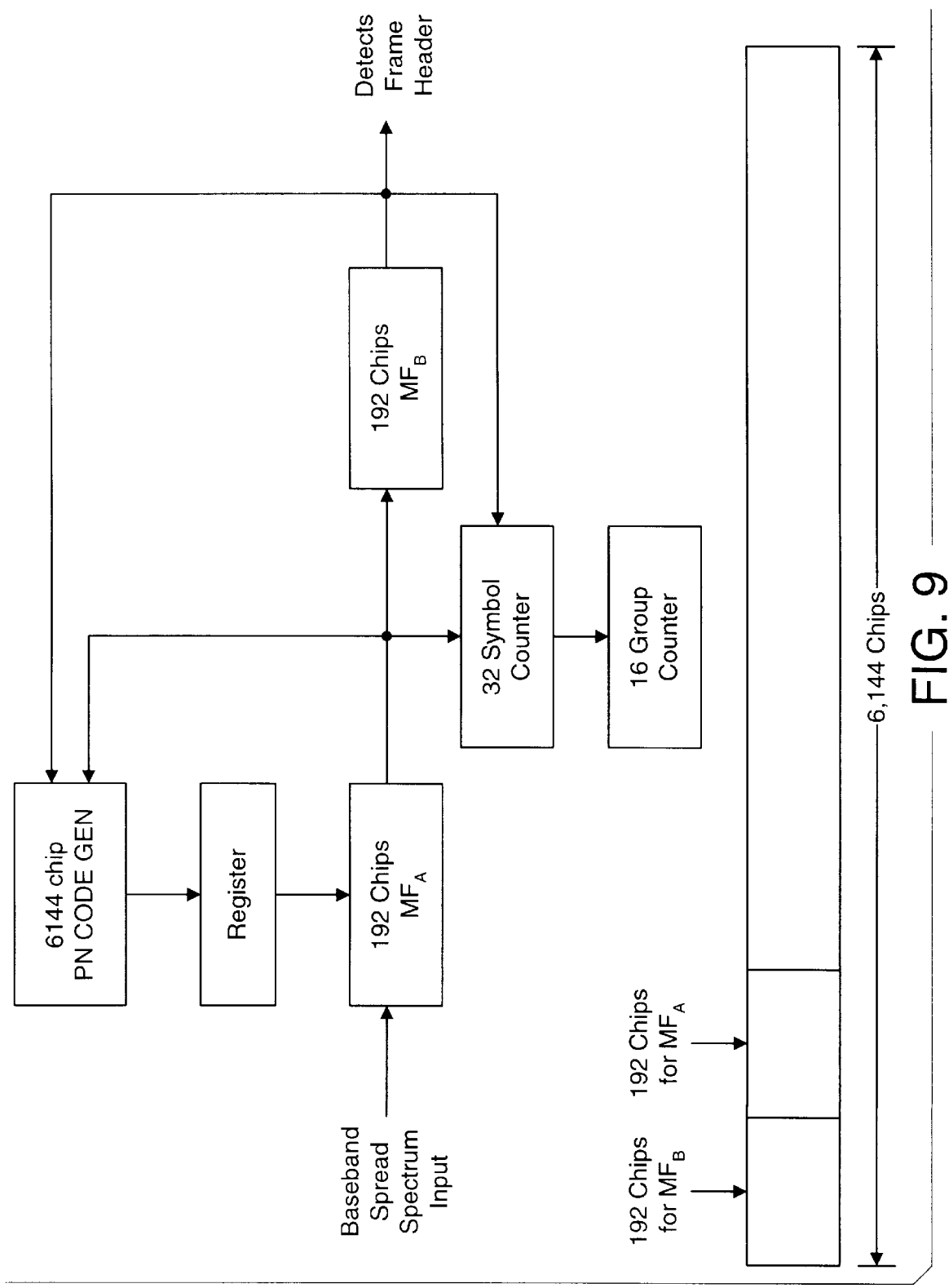
FIG. 9 illustrates the use of a matched filter in a W-CDMA/W-CDMA system to acquire an incoming 384 chip header and then dynamically change the matched filter coefficients.

FIG. 9 illustrates the use of the matched filter to acquire the incoming 384 chip header and then change the matched filter coefficients "on the fly" to demodulate the data within the frame.

The reverse link, i.e., the link from the remote unit to the base station, is a single channel transmission consisting of call set up followed by information transmission. The information frame contains headers, reverse APC, coded data, and maintenance (signaling, CRC, etc.). Forward error correction ha a rate of ½ and a constraint length of seven, with convolutional coding. Reverse APC is sent every 605 μs. A RAKE receiver may be used capable of resolving up to 192 multipaths during a single symbol. All multipaths within 6 dB of the maximum returned signal are combined using maximal ratio combined. The link uses BPSK modulation/FDD, and up to 192 orthogonal codes may be employed in any sector. Each sector and each cell employs different codes. Power is updated every 605 μs. Time is adjusted every 605 μs. Single or multiple, asynchronous or synchronous, packet transmission or reception is permitted since synchronization is to the packet's header. This feature is invaluable for Internet access and ATM access.

On the reverse link, a timing adjustment is provided and the incoming packet arrival is compared to a reference time. An ATC signal is sent from the base to the remote unit requesting a delay or advance in transmission. In this manner, the remote unit packets arrive at the base in synchronism, and will be orthogonal to one another. While this procedure most assuredly works properly for fixed wireless systems and, in many case, works properly for pedestrian-operated systems, when high speed mobile communication is required, it is unclear that this technique permits sufficiently accurate timing to ensure orthogonality.

Figure 10:
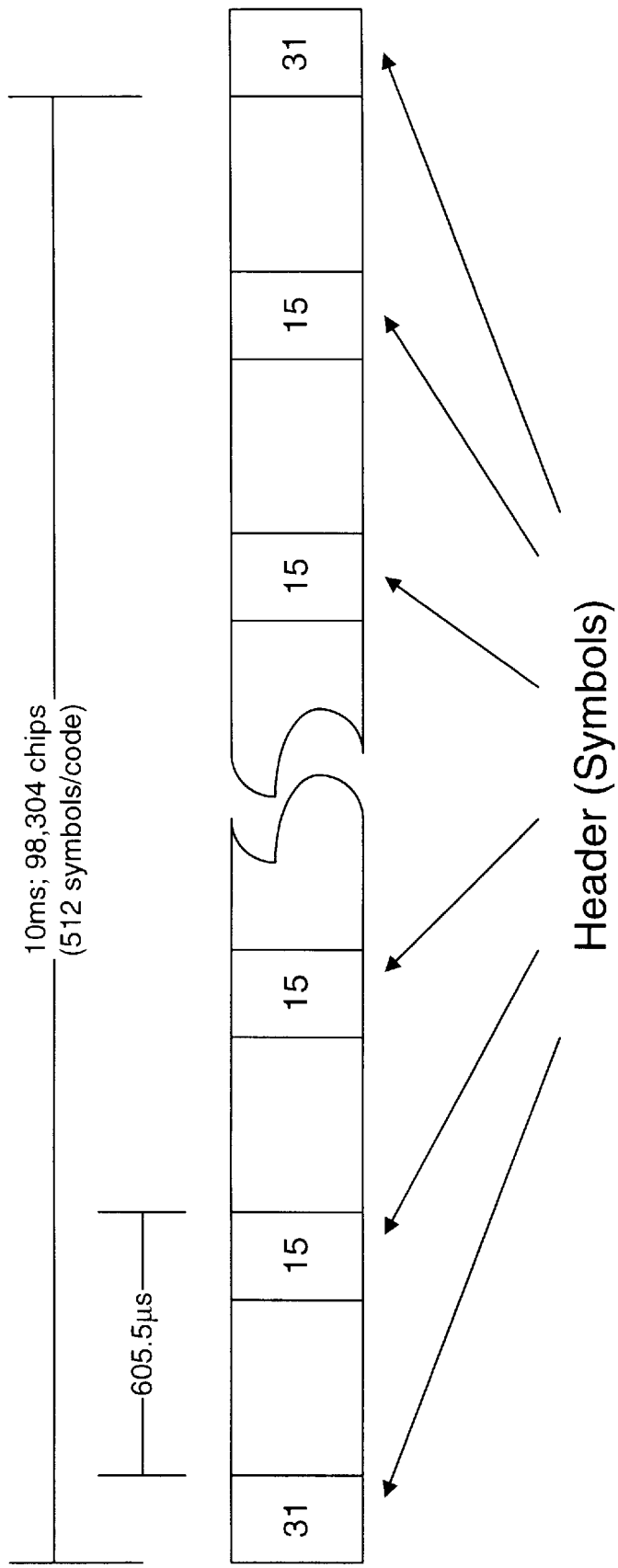
FIG. 10 shows the frame structure of a remote unit packet.

FIG. 10 shows the frame structure of the remote unit packet. As shown in Table II, for ISDN (144 kb/s) transmission, the W-CDMA system can accommodate up to 27 simultaneous users/sector. Assuming a six-sector cell, that is 142 users/cell in a bandwidth of 2×10=20 MHz.

equipment. No modification of the end office switch or mobile switch controller is required. A bandwidth of 5, 10, 15, and 20 MHz (QPSK) may be used, with a rate of ½, a constraint length of seven, a convolutional coder, and 98,304 chips per frame. The design demonstrates battery efficient operation, awakening for 10–20 ms every two seconds, and is software controllable.

TDMA/CDMA System

The performance of wireless systems is limited by multipath interference. To minimize the effect of such interference, one often employs W-CDMA with a time diversity (RAKE) receiver.

A CDMA system provides significant immunity to multipath fading but is interference limited, i.e., many users, transmitting using different spreading codes, find that these codes have a non-zero cross correlation, resulting in a received noise power, which is proportional to the number of users. In the forward transmission path (base-to-remote unit) each user's signal can be spread using orthogonal pseudo-random sequences to insure that the user interference is zero. Thus, in the forward path, W-CDMA is desirable.

In the reverse path, using CDMA, the signals cannot always be adjusted to be orthogonal to one another when received at the base station. As indicated above, this is particularly true for high speed mobile communication. Therefore, the cross correlation is not readily made equal to zero. Hence, in-cell user interference restricts the system's capacity. TDMA, while enjoying in-cell orthogonality user-to-user, is subject to the non-orthogonality caused by multipath, and spillover from adjacent sectors and cells. However, if TDMA is employed and each user's burst transmission is spread then, since only one user transmits to the base (the reverse path) at a time, there is no user-to-user interference. The processing gain of the spreading process

TABLE II

| | | | | | | | | Capacity/Sector* | | | |
| | | | | | | | | Es/n = 3 dB | | Es/n = 6 dB | |
| Info Rate (kbps) | Proc. Gain | # of Codes | Symbols in Frame | Symbols used by Headers | Symbols available | Symbols used for data + FEC | Symbols Available for Maint.*** | Non-ortho users | Ortho users**** | Non-ortho users | Ortho users |
|---|---|---|---|---|---|---|---|---|---|---|---|
| 16** | 192 | 1 | 512 | 256 | 256 | 160 | 96 | 128 | 192 | 64 | 192 |
| 32 | 192 | 2 | 1024 | 256 | 768 | 640 | 128 | 64 | 96 | 32 | 96 |
| 64 | 192 | 4 | 2048 | 256 | 1792 | 1280 | 512 | 32 | 48 | 16 | 48 |
| 144 | 192 | 7 | 3564 | 256 | 3328 | 2880 | 448 | 18 | 27 | 9 | 27 |
| 384 | 192 | 16 | 8192 | 256 | 7936 | 7660 | 256 | 8 | 12 | 4 | 12 |
| 2048 | 192 | 81 | 41472 | 256 | 41216 | 40960 | 256 | 1 | 1 | 0 | 0 |

Figure 11:
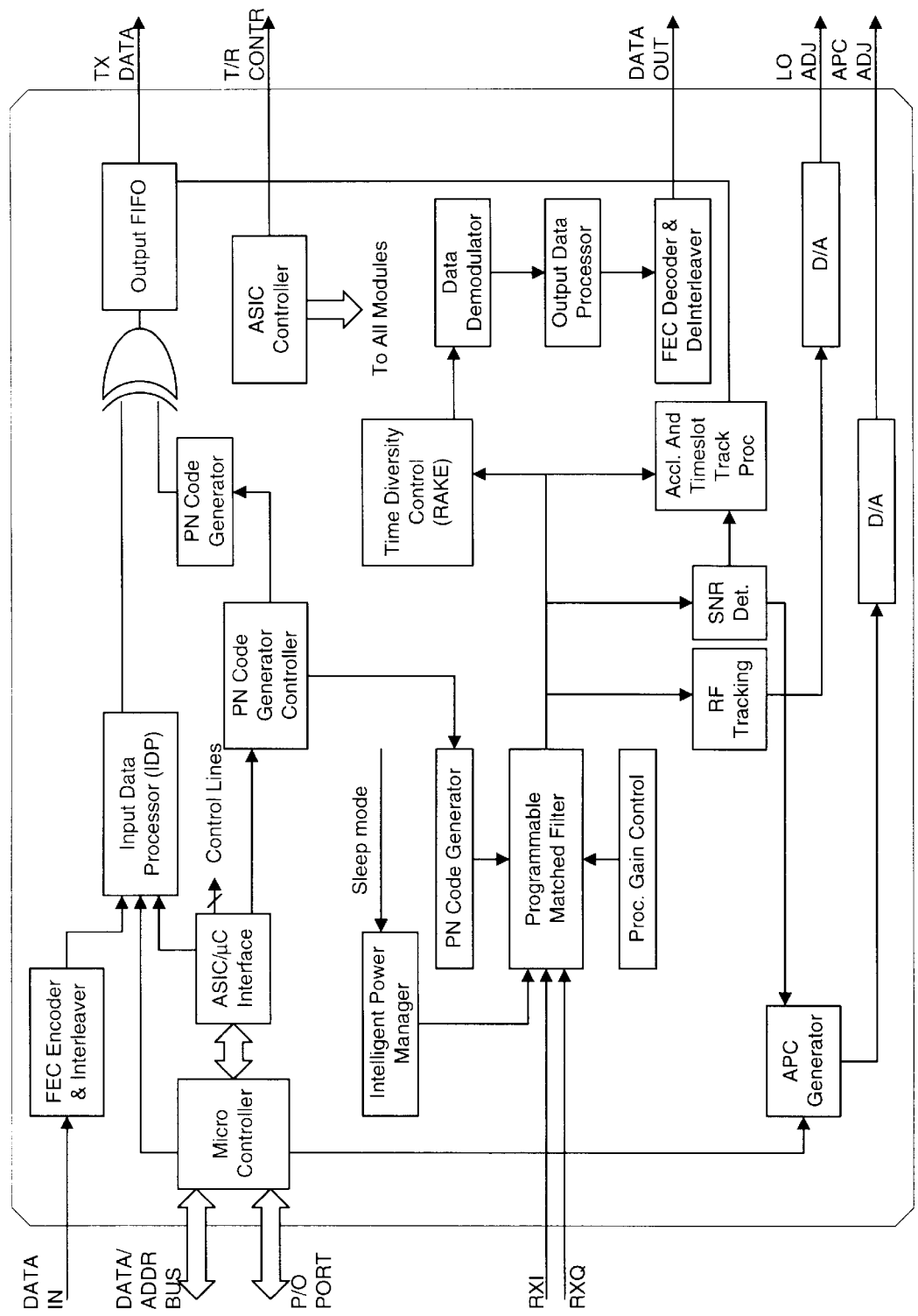
FIG. 11 is a schematic diagram of an application specific integrated circuit (ASIC)

*Capacity assumes a 50% spill over from adjacent sectors and cells
**16 kbps operation does not employ R = ½ FEC
***Maintenance includes APC, CRC, etc.
****Limited by number of available orthogonal codes The present design includes an ASIC as shown in FIG. 11. The chip supports data rates of 16, 32, 64, 144, and 384 kb/s, including session and packet communications (packet up to 12 Mbps). For ISDN, the chip replaces the user interface. A single system design works for fixed, pedestrian, and mobile applications. Handoff is required but codes may be changed on the fly. The design includes a RAKE receiver that selects multipath in one symbol. Operation is at 2.0 GHz or above, with two samples per chip. The design supports orthogonal multirate codes and incorporates automatic timing control (ATC) to maintain upstream orthogonality. Other design features include upstream and downstream APC, interference cancellation, and compatibility with ATM network must supply the isolation needed to ameliorate multipath and spillover. However, since TDMA, by its very nature, increases the data rate of the signal to be transmitted, the processing gain is typically reduced for such systems and hence the immunity to multipath is significantly reduced.

In this section, a spread-TDMA reverse link is employed, which uses a set of orthogonal codes for each user, so that the processing gain remains high.

Figure 12:
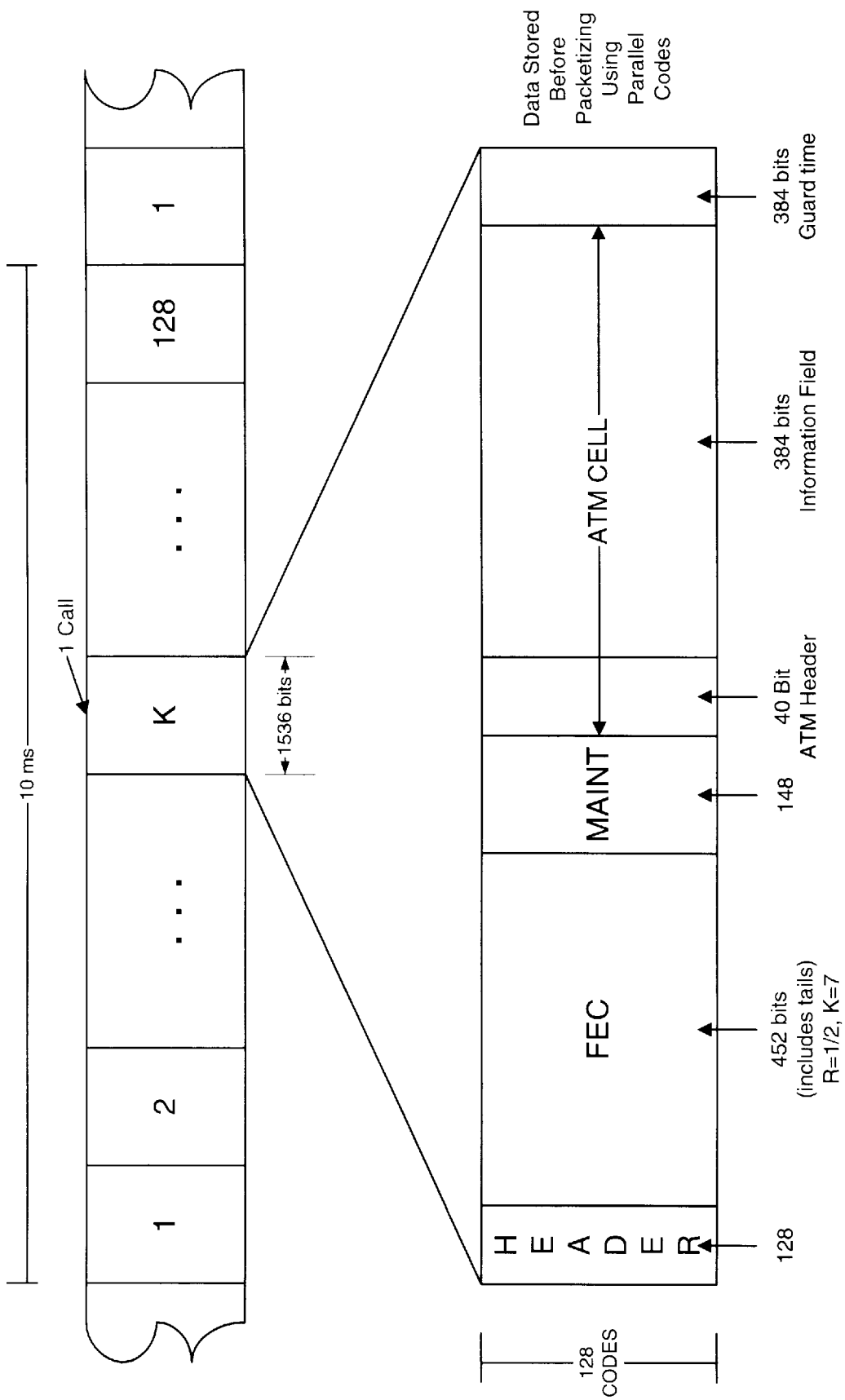
FIG. 12 illustrates a 128-cell frame lasting ten milliseconds for the TDMA/CDMA reverse link.
Figure 13:
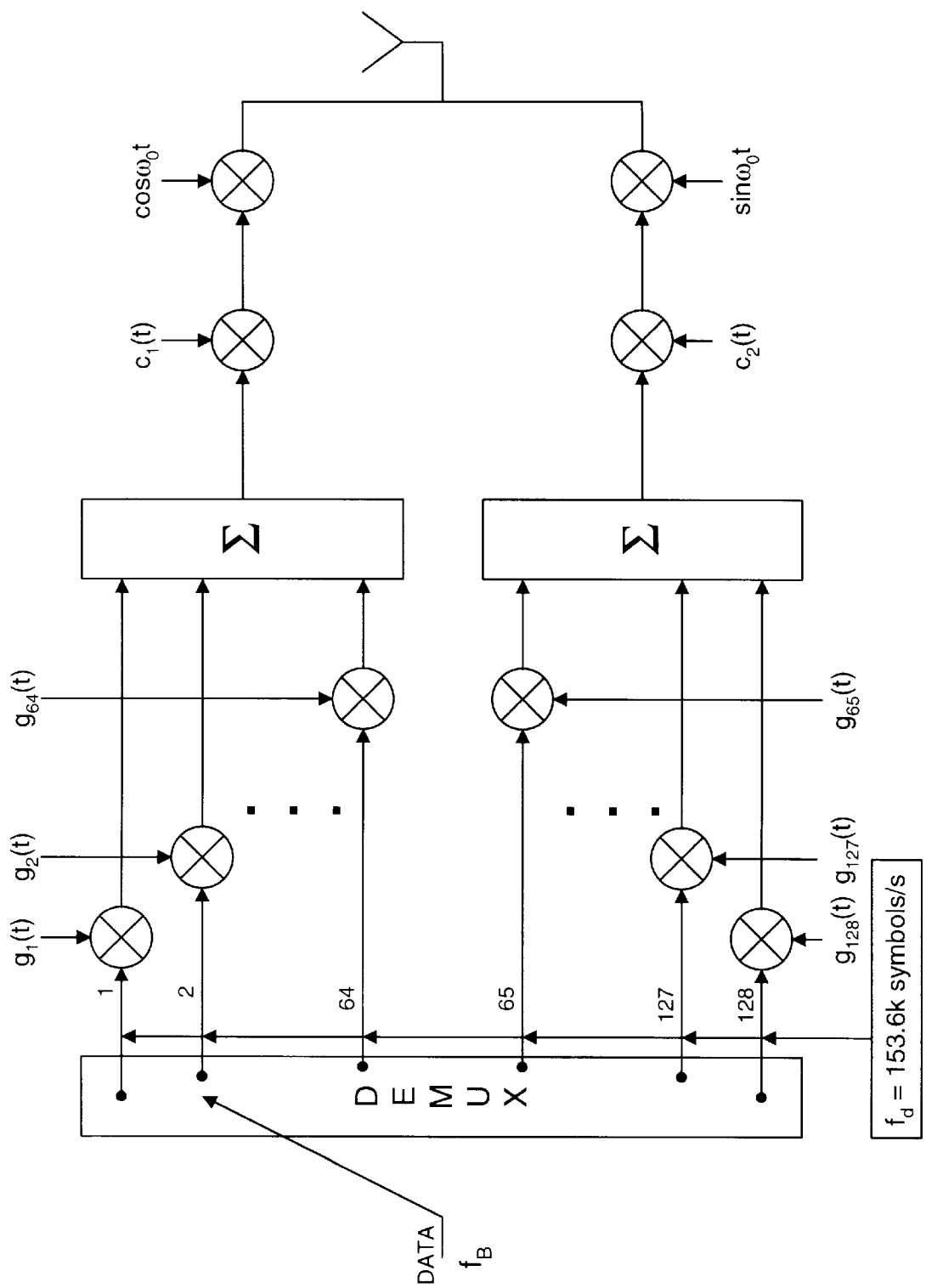
FIG. 13 is a schematic demonstrating the TDMA/CDMA reverse link.
Figure 14:
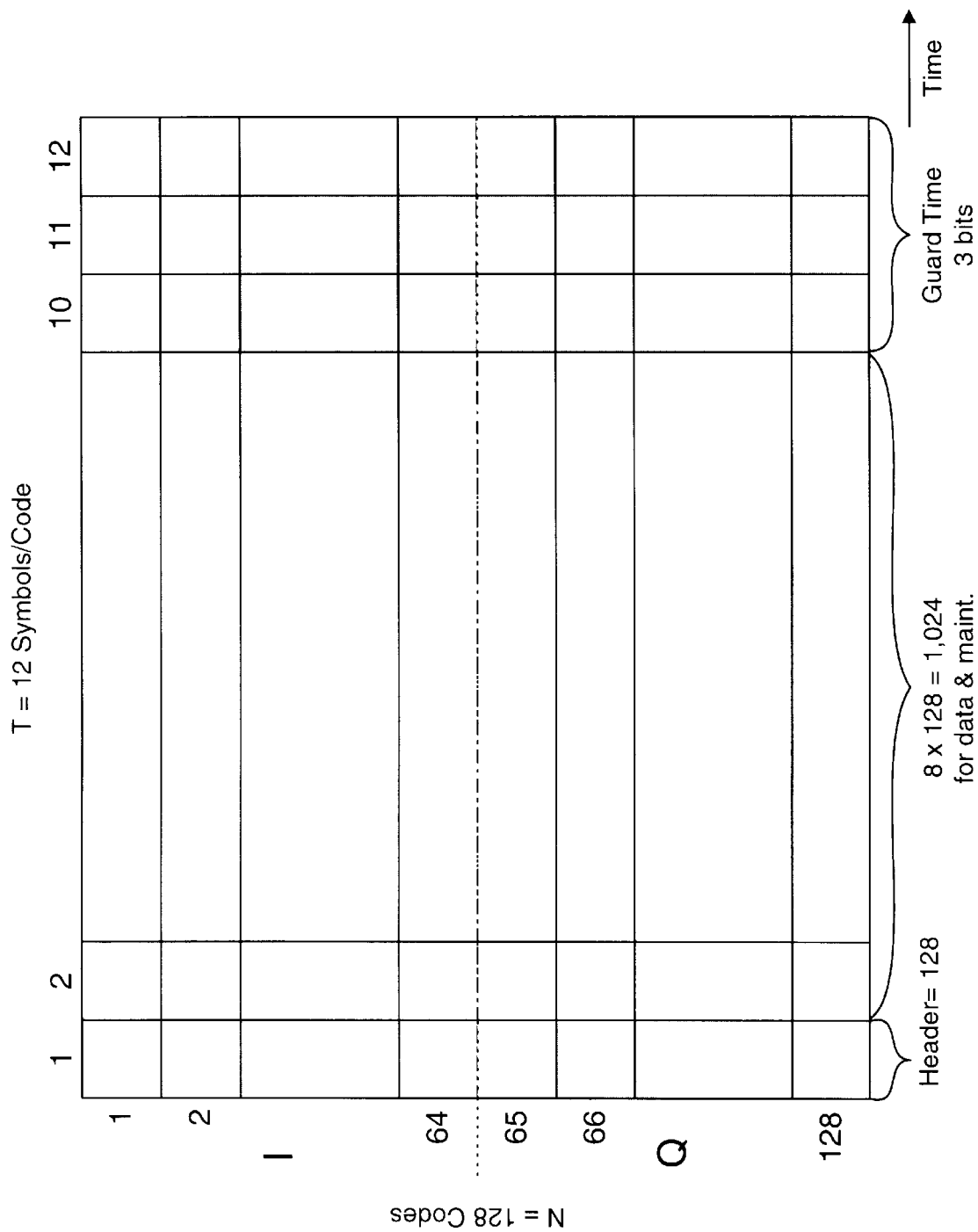
FIG. 14 shows the construction of a cell, with each chip-sequence signal being 12 bits in length, for the TDMA/CDMA reverse link.

FIG. 12 shows a 128-cell frame lasting 10 ms on a TDMA/CDMA reverse link. Each cell contain s a single ATM cell. It has a header, FEC, and maintenance information, in addition to the ATM cell information. The guard time is the transmission uncertainty due to near-far propagation delay considerations. Each cell consists of 1536 bits, which are demultiplexed into 128 different signals, each signal being spread by a different pseudo random orthogonal sequence. This result is shown in FIG. 13. As a result of using 128 signals rather than one, the processing gain is increased 128 times. As shown in FIG. 14, each chip-sequence signal is 12 bits long, so that the entire packet, including the guard time, is 12×128=1536 bits, as required; of course, during the guard time, there is no transmission.

Each of the 128 spreading chip-sequence signals is used by each of the users in each sector of every cell. Since there are only 64 orthogonal sequences available, the processing gain is 64, and to minimize cross-correlation interference between users of nearby sectors, each sector employs a second, long, pseudorandom sequence, with in-phase and quadrature-phase components, $C_1$ and $C_2$, as shown in FIG. 13. $C_1$ and $C_2$ are different chip-sequence signals for different sectors and different cells.

The system capacity is determined by the reverse link, as summarized in Table III as a function of data rate.

TABLE III

| INFO Rate (kb/s) | Number of Time Slots Required/10 ms Frame | Number of Users |
|---|---|---|
| 16 | 1 | 128 |
| 32 | 1 | 123 |
| 64 | 2 | 64 |
| 144 | 4 | 32 |
| 384 | 10 | 12 |
| 2048 | 54 | 2 |
| 5427.2 | 128 | 1 |

$f_c$ = 9.3304 Mchips/s
Processing Gain = 64
Number of Parallel Codes = 123
Time Slots Avail/Code/Packet = 12
Time Slots/Frame = 128

Note from FIG. 12 that there are 128 time slots in a packet. Table III presents the number of time slots required for each data rate. If it is assumed that all users operate at the same data rate, the number of simultaneous users (capacity) is given in Table III. Of course, since this system also supports Poisson distributed packet communications, the capacity of packet users is increased at least ten-fold.

The signal to interference ratio, S/I that appears at the output of the matched filter of any one code is:

$$\frac{S}{I} = \frac{P_1(PG)}{I_1(N/2)}$$

where $P_1/I_1$ is the ratio of the desired signal to the multipath interference. The processing gain, PG, is the ratio of the chip rate to the symbol rate. It is seen that the symbol rate, $f_a=f_b/N=153.6$ ksps. Therefore, $$PG = \frac{f_c}{f_{b/N}} = \frac{Nf_c}{f_b} = \frac{9.8304\ Mcps}{153.6\ ksps} = 64$$

The processing gain is 64. Therefore, the signal to interference ratio is, $$\frac{S}{I} = \frac{P_1\ (64)}{I_1\ (64)} = \frac{P_1}{I_1}$$

Suppose the interference is only 3 dB below and the delay spread is one or more chips from the desired signal. The resulting signal to interference ratio, Es/η, would be 3 dB which yields a bit error rate (BER) of less than $10^{-8}$ for coherent detection and soft decision convolutional decoding. The use of RAKE and space diversity lowers the error rate even further.

The common air interface (CAI) described operates in either a connection-oriented or connectionless mode since each packet sent by a remote unit is separately acquired using matched filter receivers. Thus, a circuit-switched telephone connection can be made or the system can operate in a slotted-ALOHA connectionless mode.

Table IV shows that the number of time slots/frame is directly proportional to chip rate (bandwidth). Thus, the capacity is directly proportional to bandwidth.

TABLE IV

| | | | |
|---|---|---|---|
| $f_c$ (Mcps) | 4.9152 | 9.8304 | 19.6608 |
| $f_d$ (Mbps) | 9.8304 | 19.6608 | 39.3216 |
| Bits in a 10 ms frame: | 98,304 | 196,608 | 393,216 |
| Bits/slot: | 1536 | 1536 | 1536 |
| Available time slots | 64 | 128 | 256 |
| No. of Users/sector at 384 kbps (10 time slots each | 6 | 12 | 25 |

Further Table IV readily shows that the system can be readily expanded to accommodate increased (or decreased) bandwidth.

The capacity of the TDMA/CDMA system is greater than that for the W-CDMA system. That is, assuming that all users operate at the same data rate, the higher capacity of the TDMA/CDMA system may be summarized as shown in Table V.

TABLE V

| Data Rate | Capacity of W-CDMA | Capacity of T/CDMA |
|---|---|---|
| 32 | 64 | 128 |
| 64 | 32 | 64 |
| 144 | 18 | 32 |
| 384 | 8 | 12 |
| 2048 | 1 | 2 |

This favorable result for TDMA/CDMA is a result of the orthogonality resulting from TDMA. In addition, the spread-TDMA system has no near-far problem to contend with, albeit a considerable peak-to-average power difference.

As a final observation, it should be noted that either system could be easily modified to accommodate increased or decreased bandwidths, for the different levels of multipath interference found in indoor and outdoor cells.

The CDMA/TDMA system and method of the present invention minimizes the problems commonly associated with CDMA and with TDMA systems. Using this system, orthogonality exists in both the forward and reverse directions, multipath is minimized, the near-far problem is eliminated, and ATM cells are transmitted employing connection-oriented or connectionless communications.

It will be apparent to those skilled in the art that various modifications can be made to the high processing gain TDMA/CDMA system and method of the instant invention without departing from the scope or spirit of the invention, and it is intended that the present invention cover modifications and variations of the high processing gain TDMA/CDMA system and method provided they come within the scope of the appended claims and their equivalents.

We claim:

1. A spread-spectrum time-division-multiple-access (SS-TDMA) system for communicating data, comprising:

a remote unit having a SS-TDMA transmitter, said SS-TDMA transmitter including,
   a transmitter-first-in-first-out (transmitter-FIFO) memory, coupled to a data input, for storing data;
   a transmitter TDMA subsystem, coupled to said transmitter-FIFO memory, for sending the data in a time slot from said transmitter-FIFO memory as TDMA data;
   a demultiplexer, coupled to said transmitter TDMA subsystem and having a plurality of outputs, for demultiplexing the TDMA data into a plurality of sub-data-sequence signals, with a respective sub-data-sequence signal at a respective output of said demultiplexer;
   chip-sequence means for outputting a plurality of chip-sequence signals, with each chip-sequence signal orthogonal to the other chip-sequence signals in said plurality of chip-sequence signals;
   a plurality of product devices, coupled to the plurality of outputs of said demultiplexer, respectively, and to said chip-sequence means, for multiplying each of the sub-data-sequence signals by a respective chip-sequence signal, thereby generating a plurality of spread-spectrum channels;
   a combiner, coupled to the plurality of product devices, for algebraically combining the plurality of spread-spectrum channels as a multichannel-spread-spectrum signal;
   a header device, coupled to said combiner, for concatenating a header for chip-sequence synchronization, to the multichannel-spread-spectrum signal, thereby generating a spread-spectrum time division multiple access (SS-TDMA) signal; and
   a transmitter-carrier subsystem, coupled to said header device, for transmitting on a carrier frequency the SS-TDMA signal using radio waves over a communications channel; and
a base terminal having a SS-TDMA receiver, said SS-TDMA receiver including,
   a translating device, coupled to the communications channel, for translating the SS-TDMA signal from the carrier frequency to a processing frequency;
   a header-matched filter, coupled to said translating device and having an impulse response matched to the header, for detecting, at the processing frequency, the header in the SS-TDMA signal, and for outputting, responsive to detecting the header, a header-detection signal;
   a receiver processor, coupled to said header-matched filter, responsive to the header-detection signal, for generating control and timing signals;
   a plurality of data-matched filters, coupled to said translating device, with each data-matched filter having an impulse response matched to a chip-sequence signal of the plurality of chip-sequence signals, respectively, for despreading the multichannel-spread-spectrum signal embedded in the SS-TDMA signal as a plurality of received spread-spectrum channels, respectively;
   a multiplexer, coupled to said plurality of data-matched filters, for multiplexing the plurality of received spread-spectrum channels as received-TDMA data;
   a receiver-TDMA subsystem, coupled to said receiver processor and responsive to the control and timing signals, for selecting the received TDMA data from a particular time slot as received data; and
   a receiver-FIFO memory, coupled to said receiver TDMA subsystem, for storing the received data, and for outputting the received data to a data output.

2. The SS-TDMA system as set forth in claim 1, with said base terminal further comprising a transmitter CDMA subsystem for sending data to the remote unit as a wideband-CDMA signal.

3. The SS-TDMA system as set forth in claim 2, with said remote unit further comprising a receiver CDMA subsystem for receiving the wideband-CDMA signal.

4. A method for communicating data between a remote unit and a base terminal using spread-spectrum comprising the steps, at the remote unit, of:
   storing data in a memory;
   sending the data from the memory in an assigned time slot as TDMA data;
   demultiplexing the TDMA data into a plurality of sub-data sequence signals;
   generating a plurality of chip-sequence signals;
   multiplying each of the plurality of sub-data sequence signals by a respective chip-sequence signal to generate a plurality of spread-spectrum channels;
   algebraically combining the plurality of spread-spectrum channels as a multi-channel spread-spectrum signal;
   concatenating a header to the multi-channel spread-specrum signal to generate a SS-TDMA-spread-spectrum signal; and
   transmitting the SS-TDMA-spread-spectrum signal to the base terminal.

5. The method as set forth in claim 4, further comprising the steps, at the base terminal, of:
   translating the SS-TDMA-spread-spectrum signal to a processing frequency;
   detecting the header embedded in the SS-TDMA-spread-spectrum signal;
   outputting a header-detection signal and generating control and timing signals;
   despreading the multi-channel-spread-spectrum signal as a plurality of received spread-spectrum channels;
   multiplexing the plurality of received spread-spectrum channels as received-TDMA data;
   selecting, within a time slot of a sequence of time slots, the received-TDMA data as received data; and
   storing the received data in a memory for output to a data output.

6. The method as set forth in claim 5, further comprising the step, at the base terminal, of:
   transmitting data to the remote unit as a CDMA-spread-spectrum signal.

7. The method as set forth in claim 6, further comprising the step, at the remote unit, of:
   despreading and multiplexing the CDMA-spread-spectrum signal to recover the data.

* * * * *